(12) United States Patent
govind ram

(10) Patent No.: US 11,820,291 B2
(45) Date of Patent: Nov. 21, 2023

(54) MOVING SIDE MIRROR FOR A VEHICLE

(71) Applicant: Nitin govind ram, Gurugram (IN)

(72) Inventor: Nitin govind ram, Gurugram (IN)

(*) Notice: Subject to any disclaimer, the term of this patent is extended or adjusted under 35 U.S.C. 154(b) by 368 days.

(21) Appl. No.: 17/149,688

(22) Filed: Jan. 14, 2021

(65) Prior Publication Data

US 2021/0221291 A1 Jul. 22, 2021

(30) Foreign Application Priority Data

Jan. 16, 2020 (IN) .............................. 202011002032

(51) Int. Cl.
*B60R 1/072* (2006.01)
(52) U.S. Cl.
CPC .................................... B60R 1/072 (2013.01)
(58) Field of Classification Search
CPC ................................ B60R 1/072; B62J 29/00
USPC ......................................................... 359/843
See application file for complete search history.

(56) References Cited

U.S. PATENT DOCUMENTS

| | | | | |
|---|---|---|---|---|
| 4,281,898 A * | 8/1981 | Ochiai | ................. | G02B 7/1828 359/606 |
| 4,781,436 A * | 11/1988 | Armbruster | ............. | B60R 1/087 359/606 |
| 7,837,339 B2 | 11/2010 | Sakamoto | | |
| 9,046,652 B2 | 6/2015 | Whinnery | | |
| 2007/0182528 A1 * | 8/2007 | Breed | ................... | B60W 30/16 348/148 |
| 2013/0010379 A1 * | 1/2013 | Sakata | ................... | B60R 1/076 359/841 |

OTHER PUBLICATIONS

Examiner provided machine translation of Tsuyoshi, WO 03097410 A1 (Year: 2003).*
Examiner provided machine translation of Masahiro et al., JP 2004244002 (Year: 2004).*
Examiner provided machine translation of Lin J, CN 205971068 (Year: 2017).*

* cited by examiner

*Primary Examiner* — Balram T Parbadia
*Assistant Examiner* — Rahman Abdur
(74) *Attorney, Agent, or Firm* — Schneer IP Law

(57) ABSTRACT

Disclosed herein is a moving side mirror for a vehicle, in accordance with some embodiments. Further, the moving side mirror is configured to be rotatably mounted on the vehicle. Further, the moving side mirror comprises an input device and an actuator. Further, the input device is configured for receiving an external action on a portion of the input device. Further, the actuator is operationally coupled with the input device. Further, the actuator is configured for rotating the moving side mirror relative to the vehicle around an axis in a forward direction from an original position of the moving side mirror to an extreme position of the moving side mirror based on the external action. Further, the actuator is configured for rotating the moving side mirror relative to the vehicle around the axis in a reverse direction from the extreme position to the original position after a predetermined duration of time.

18 Claims, 21 Drawing Sheets

MOVING SIDE MIRROR FOR A VEHICLE

RELATED APPLICATION

The present application claims priority to, and is a nonprovisional application of Indian Provisional Application No. 202011002032 entitled: Moving Side Mirror For Vehicles filed on Jan. 16, 2020, the disclosure of which is hereby incorporated by reference in their entirety herein and below.

FIELD OF THE INVENTION

Generally, the present disclosure relates to the field of land vehicles: bodies and tops. More specifically, the present disclosure relates to a moving side mirror for a vehicle.

BACKGROUND OF THE INVENTION

Drivers faces problem in controlling a side mirror while driving a vehicle (such as a motorcycle, a car, a bicycle, etc.). Further, the side mirror does not enable the drivers to control the orientation of the side mirror using the press of a button.

Therefore, there is a need for an improved moving side mirror for a vehicle that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a moving side mirror for a vehicle, in accordance with some embodiments. Further, the moving side mirror may be configured to be rotatably mounted on the vehicle. Further, the moving side mirror may include at least one input device and at least one actuator. Further, the at least one input device may be configured for receiving at least one external action on at least a portion of the at least one input device. Further, the at least one actuator may be operationally coupled with the at least one input device. Further, the at least one actuator may be configured for rotating the moving side mirror relative to the vehicle around at least one axis associated with the moving side mirror in a forward direction from an original position of the moving side mirror to at least one extreme position of the moving side mirror based on the receiving of the at least one external action. Further, the at least one actuator may be configured for rotating the moving side mirror relative to the vehicle around the at least one axis in a reverse direction from the at least one extreme position to the original position after a predetermined duration of time based on the rotating of the moving side mirror from the original position to the at least one extreme position. Further, the reverse direction may be opposite to the forward direction.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
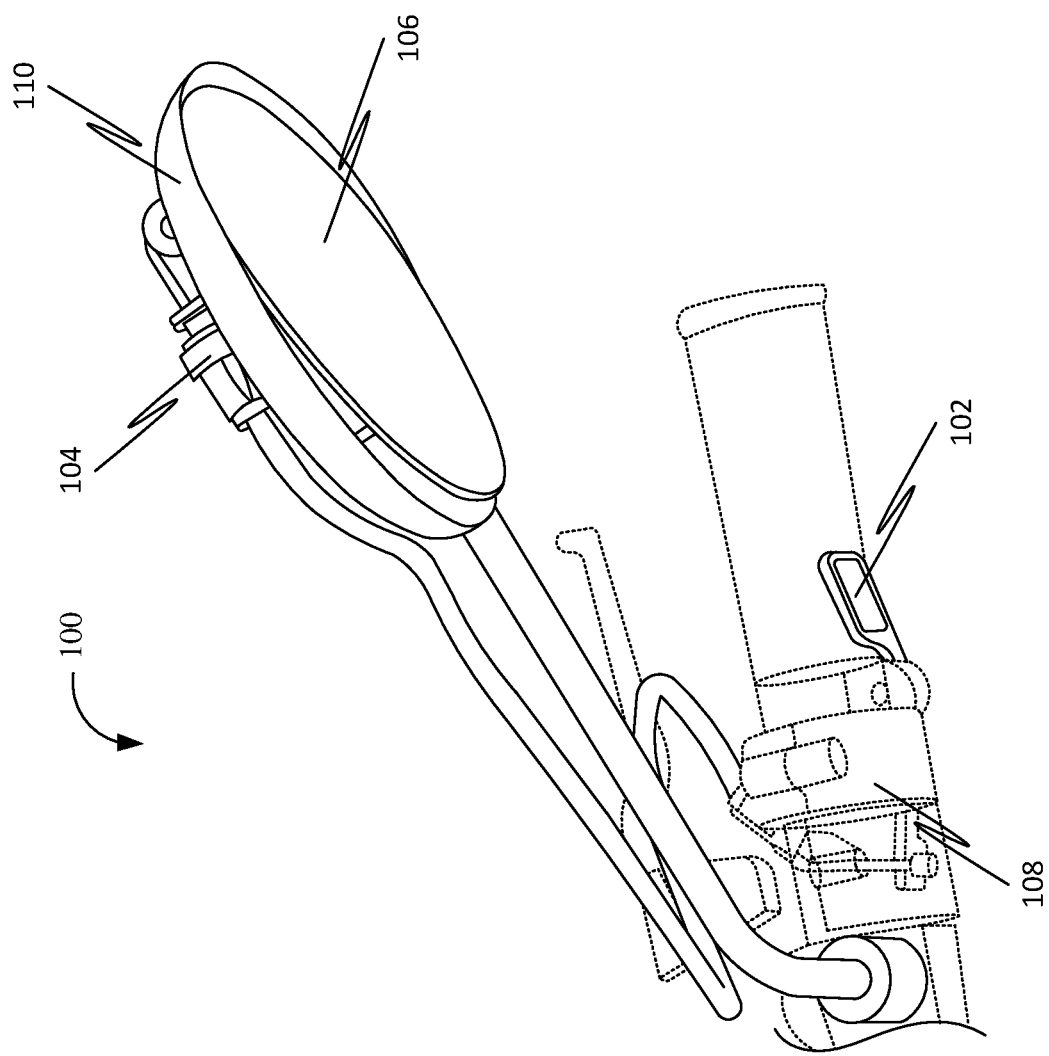
FIG. 1 is a top perspective view of a moving side mirror for a vehicle, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a moving side mirror for a vehicle, embodiments of the present disclosure are not limited to use only in this context.

Overview

The present disclosure describes a moving side mirror for a vehicle. Further, disclosed the moving side mirror may include a wire and/or cable with a lever, an electromagnet, a solenoid, two electromagnets, a hydraulic, and a motorized mechanism. Further, the moving side mirror may be configured to move through a different position by a push of a button from the vehicles. Further, the button may include an additional button installed in at least one of the vehicles and the moving side mirror. Further, the button may include an existing button associated with the vehicles. Further, the existing button may be repurposed for the moving side mirror. Further, car drivers may control the side mirror using buttons from inside the car. Similarly, controls need to be provided to bike drivers. For instance, the driver may flick the button to move the side mirror to turn for a while and then come back to the original position. Further, the moving side mirror may be configured to move to a certain position from an original position and return to the original position from a certain position by a push of the button.

Further, the moving side mirror may be comprised of a material such as metal, glass, etc. Further, the metal may include aluminum, silver, etc.

Further, the moving side mirror may enable a rider of a motorcycle to control the orientation of the side mirror using the press of the button.

Further, the moving side mirror may be coupled to a bicycle, car, motorcycle, etc. Further, the buttons may be an additional one or it can be an existing one. For instance, an already fitted turn indicator switch may be used.

Further, the present disclosure describes the moving side mirror. Further, the moving side mirror is associated with a vehicle (such as a motorcycle, a car, a bicycle, etc.). Further, the moving side mirror may include a car mirror, a motorcycle mirror, a bicycle mirror, etc. Further, the moving side mirror may be configured for rotating to an extreme position from an original position and return to the original position from the extreme performing an oscillation. Further, the moving side mirror may be associated with a button. Further, the button is configured for receiving at least one action from a user. Further, the button may include an additional button disposed on at least one of the vehicle and the moving side mirror. Further, the button may include an existing button associated with the vehicle. Further, the existing button may be repurposed for the moving side mirror. Further, the moving side mirror may be configured for performing the oscillation based on the at least one action. Further, the oscillation is associated with an oscillating time period. Further, the oscillation may be associated with an oscillating frequency. Further, the moving side mirror may include an elastic band (or an elastic spring), a revolute joint, an electromagnet, a stopper, a mirror, and an iron plate.

Further, the moving side mirror enables a rider of a motorcycle to control the orientation of the moving side mirror using the press of a button.

Further, the moving side mirror turns for a while and then comes back to its original position by a flick of a button by a driver of the vehicle associated with the moving side mirror.

FIG. 1 is a top perspective view of a moving side mirror 100 for a vehicle 108, in accordance with some embodiments. Further, the moving side mirror 100 may be configured to be rotatably mounted on the vehicle 108. Further, the vehicle 108 may include a motorcycle, a car, a bicycle, etc. Further, the moving side mirror 100 may include at least one input device 102 and at least one actuator 104. Further, the moving side mirror 100 may include an inner surface (not shown) and an outer mirror surface 106. Further, the outer mirror surface 106 may be a reflective surface. Further, the moving side mirror 100 forms at least one image of at least one object based on the reflective surface for viewing the at least one object on the outer mirror surface 106 by a user. Further, the user may include an individual driving the vehicle 108. Further, the at least one object may be present proximal to the vehicle 108. Further, the at least one object may include at least one first vehicle. Further, the moving side mirror 100 as used herein, generally refers to any reflective surfaces comprised of a material such as glass, metal (such as aluminum, silver, etc.), etc.

Further, the at least one input device 102 may be configured for receiving at least one external action on at least a portion of the at least one input device 102. Further, the at least one input device 102 may include a button, a switch, etc. Further, the at least one external action may include a pressing action associated with the button. Further, the at least one external action may include a flicking action associated with the switch.

Further, the at least one actuator 104 may be operationally coupled with the at least one input device 102. Further, the at least one actuator 104 may be configured for rotating the moving side mirror 100 relative to the vehicle 108 around at least one axis associated with the moving side mirror 100 in a forward direction from an original position of the moving side mirror 100 to at least one extreme position of the moving side mirror 100 based on the receiving of the at least one external action. Further, the at least one actuator 104 may be configured for rotating the moving side mirror 100 relative to the vehicle 108 around the at least one axis in a reverse direction from the at least one extreme position to the original position after a predetermined duration of time based on the rotating of the moving side mirror 100 from the original position to the at least one extreme position. Further, the predetermined duration of time may include at least one second, at least one minute, etc. Further, the reverse direction may be opposite to the forward direction. Further, in an instance, the rotating of the moving side mirror 100 in the forward direction around the at least one axis may refer to the rotating of the moving side mirror 100 in a counter-clockwise direction around the at least one axis. Further, in an instance, the rotating of the moving side mirror 100 in the reverse direction around the at least one axis may refer to the rotating of the moving side mirror 100 in a clockwise direction around the at least one axis.

In further embodiments, a mounting assembly may be configured for mounting the moving side mirror 100 on the vehicle 108. Further, the mounting assembly allows at least one of the rotating of the moving side mirror 100 in the forward direction from the original position to the at least one extreme position and the rotating of the moving side mirror 100 in the reverse direction from the at least one extreme position to the original position around the at least one axis.

Figure 2:
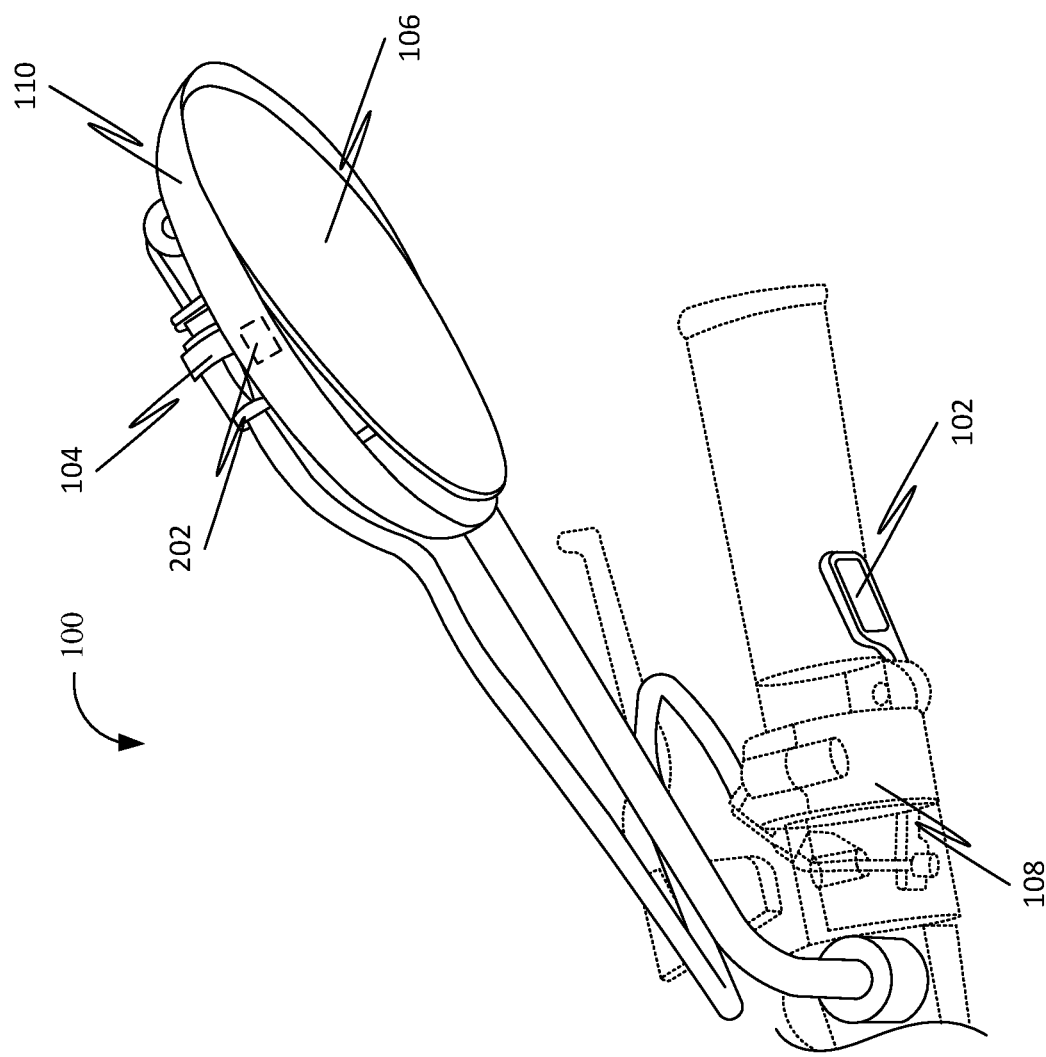
FIG. 2 is a top perspective view of the moving side mirror for the vehicle, in accordance with some embodiments.

Further, in some embodiments, the rotating of the moving side mirror 100 in the forward direction may be associated with a forward rotating speed and the rotating of the moving side mirror 100 in the reverse direction may be associated with a reverse rotating speed. Further, in an embodiment, the forward rotating speed of the moving side mirror 100 may be equal to the reverse rotating speed of the moving side mirror 100. Further, in an embodiment, the forward rotating speed of the moving side mirror 100 may be slower than the reverse rotating speed of the moving side mirror 100. Further, in an embodiment, the forward rotating speed of the moving side mirror 100 may be faster than the reverse rotating speed of the moving side mirror 100. Further, in an embodiment, a controller 202, as shown in FIG. 2, may be communicatively coupled with the at least one input device 102. Further, the controller 202 may be a processing device. Further, the at least one input device 102 may be configured for generating at least one signal based on the receiving of the at least one external action. Further, the controller 202 may be configured for analyzing the at least one signal. Further, the controller 202 may be configured for determining the forward rotating speed and the reverse rotating speed based on the analyzing of the at least one signal. Further, the at least one actuator 104 may be communicatively coupled with the controller 202. Further, the rotating of the moving side mirror 100 in the forward direction with the forward rotating speed and the rotating of the moving side mirror 100 in the reverse direction with the reverse rotating speed may be based on the determining the forward rotating speed and the reverse rotating speed.

In further embodiments, the controller 202, as shown in FIG. 2, may be communicatively coupled with the at least one input device 102. Further, the at least one input device 102 may be configured for generating at least one signal based on the receiving of the at least one external action. Further, the controller 202 may be configured for analyzing the at least one signal. Further, the controller 202 may be configured for determining the predetermined duration of time based on the analyzing. Further, the at least one actuator 104 may be communicatively coupled with the controller 202. Further, the rotating of the moving side mirror 100 in the reverse direction from the at least one extreme position to the original position after the predetermined duration of time may be based on the determining.

Figure 3:
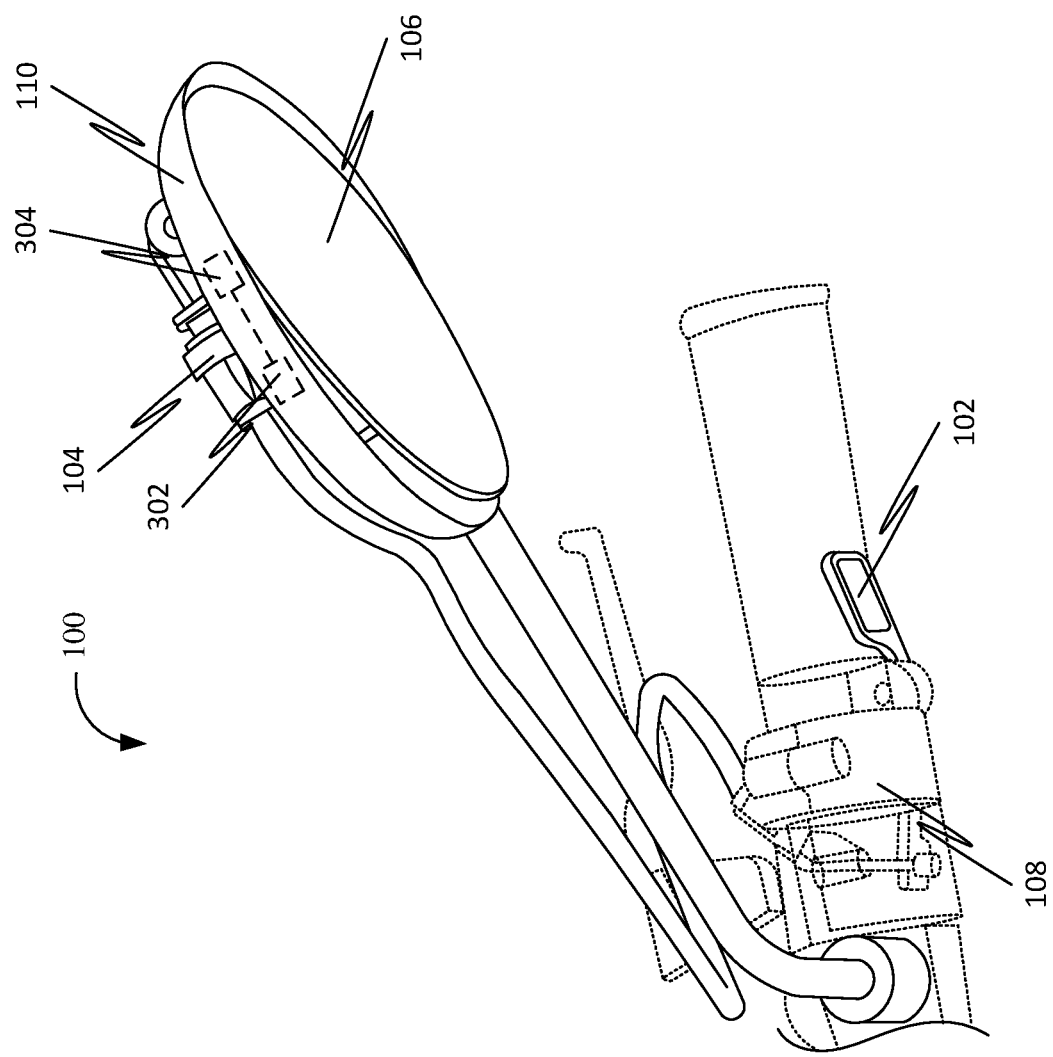
FIG. 3 is a top perspective view of the moving side mirror for the vehicle, in accordance with some embodiments.

In further embodiments, the moving side mirror 100 may include at least one sensor 302 and a controller 304, as shown in FIG. 3. Further, the at least one sensor 302 may be configured for generating at least one sensor data based on a position of at least one object in relation to the vehicle 108. Further, the at least one sensor 302 may include a proximity sensor. Further, the at least one object may include at least one first vehicle. Further, the controller 304 may be communicatively coupled with the at least one sensor 302.

Further, the controller 304 may be configured for analyzing the at least one sensor data. Further, the controller 304 may be configured for determining a viewability of the at least one object for a user in the moving side mirror 100 based on the analyzing. Further, the user may include an individual driving the vehicle 108. Further, the controller 304 may be configured for generating a command based on the determining of the viewability. Further, the controller 304 may be communicatively coupled with the at least one actuator 104. Further, at least one of the rotating of the moving side mirror 100 in the forward direction from the original position to the at least one extreme position and the rotating of the moving side mirror 100 in the reverse direction from the at least one extreme position to the original position may be based on the command.

In further embodiments, a moving side mirror holder 110 may be configured to be mounted on the vehicle 108. Further, the moving side mirror 100 may be rotatably coupled to the moving side mirror holder 110 using a rotating assembly for rotatably mounting the moving side mirror 100 on the vehicle 108. Further, the rotating assembly may include a revolute joint. Further, the rotating assembly allows at least one of the rotating of the moving side mirror 100 in the forward direction from the original position to the at least one extreme position and the rotating of the moving side mirror 100 in the reverse direction from the at least one extreme position to the original position around the at least one axis of the rotating assembly. Further, in an embodiment, the at least one actuator 104 may include at least one electromagnet attached to a first holder side of an inner holder surface of the moving side mirror holder 110. Further, the at least one electromagnet may be configured for energizing based on the receiving of the at least one external action. Further, the at least one electromagnet may be configured for attracting at least one iron plate attached to a first mirror side of an inner mirror surface of the moving side mirror 100 based on the energizing. Further, the inner holder surface opposes the inner mirror surface. Further, the first holder side opposes the first mirror side. Further, the at least one of the rotating of the moving side mirror 100 in the forward direction from the original position to the at least one extreme position and the rotating of the moving side mirror 100 in the reverse direction from the at least one extreme position to the original position may be based on the attracting. Further, in an embodiment, the at least one electromagnet may be configured for de-energizing after the at least one of the rotating of the moving side mirror 100 in the forward direction from the original position to the at least one extreme position and the rotating of the moving side mirror 100 in the reverse direction from the at least one extreme position to the original position. Further, the at least one electromagnet does not attract the at least one iron plate after the de-energizing. Further, in an embodiment, a spring may be coupled to the moving side mirror 100. Further, the spring may include an elastic band. Further, the spring may include an elastic band. Further, the spring may include a first spring end and a second spring end. Further, the first spring end may be attached to a second holder side of the inner holder surface and the second spring end may be attached to a second mirror side of the inner mirror surface. Further, the second holder side opposes the second mirror side. Further, the spring may be associated with a natural state and at least one extended state. Further, the spring transitions from the natural state to the at least one extended state based on the rotating of the moving side mirror 100 in the forward direction from the original position to the at least one extreme position. Further, the spring may be configured for retracting from the at least one extended state to the natural state based on the de-energizing. Further, the rotating of the moving side mirror 100 in the reverse direction from the at least one extreme position to the original position may be based on the retracting. Further, in an embodiment, a stopper may be coupled to the moving side mirror 100. Further, the stopper may include a first stopper end and a second stopper end. Further, the first stopper end may be attached to the inner holder surface. Further, the second stopper end extends towards the inner mirror surface. Further, the stopper may be configured for preventing the rotating of the moving side mirror 100 in the forward direction from the original position to the at least one extreme position after the de-energizing of the at least one electromagnet by supporting the moving side mirror 100 on the second stopper end.

Further, in an embodiment, the at least one actuator 104 may include a solenoid. Further, a first end of a plunger of the solenoid may be attached to an inner mirror surface of the moving side mirror 100. Further, the solenoid may be configured for retractably moving the plunger between at least one extended position and a retracted position based on the receiving of the at least one external action. Further, the at least one of the rotating of the moving side mirror 100 in the forward direction from the original position to the at least one extreme position and the rotating of the moving side mirror 100 in the reverse direction from the at least one extreme position to the original position may be based on the retractably moving.

Further, in an embodiment, the at least one actuator 104 may include a hydraulic assembly. Further, a first end of a shaft of the hydraulic assembly may be attached to an inner mirror surface of the moving side mirror 100. Further, the hydraulic assembly may be configured for retractably moving the shaft between at least one extended position and a retracted position based on the receiving of the at least one external action. Further, the at least one of the rotating of the moving side mirror 100 in the forward direction from the original position to the at least one extreme position and the rotating of the moving side mirror 100 in the reverse direction from the at least one extreme position to the original position may be based on the retractably moving.

Further, in an embodiment, the at least one actuator 104 may include a motor. Further, the motor may include a stepper motor, a servo motor, etc. Further, a shaft of the motor may be mechanically coupled with the rotating assembly. Further, the motor may be configured for reversibly rotating the shaft between a first position and at least one second position based on the receiving of the at least one external action. Further, the at least one of the rotating of the moving side mirror 100 in the forward direction from the original position to the at least one extreme position and the rotating of the moving side mirror 100 in the reverse direction from the at least one extreme position to the original position may be based on the reversibly rotating.

Further, in an embodiment, the at least one actuator 104 may include a spring and a lever. Further, the lever may include a rod. Further, a first end of the lever may be coupled with the at least one input device 102 and a second end of the lever may be coupled to the moving side mirror 100. Further, a first spring end of the spring may be attached to an inner holder surface of the moving side mirror holder 110 and a second spring end of the spring may be attached to an inner mirror surface of the moving side mirror 100. Further, the lever may be configured for rotating around a lever axis associated with the second end from a first lever position to at least one second lever position based on the at least one external action received on the first end. Further, the lever axis may be perpendicular to the lever. Further, the rotating of the moving side mirror 100 in the forward direction from the original position to the at least one extreme position may be based on the rotating of the lever around the lever axis from the first lever position to the at least one second lever position. Further, the spring transitions from a natural state to at least one extended state based on the rotating of the moving side mirror 100 in the forward direction from the original position to the at least one extreme position. Further, the spring may be configured for retracting from the at least one extended state to the natural state. Further, the lever may be configured for rotating around the lever axis from the at least one second lever position to the first lever position based on the retracting. Further, the rotating of the moving side mirror 100 in the reverse direction from the at least one extreme position to the original position may be based on the rotating of the lever around the lever axis from the at least one second lever position to the first lever position.

Further, in some embodiments, the at least one extreme position may include a plurality of extreme positions. Further, the at least one external action may include a plurality of external actions. Further, the plurality of external actions may be characterized by an amount of an external force applied on the at least the portion of the at least one input device 102. Further, the rotating of the moving side mirror 100 around the at least one axis in the forward direction from the original position to the plurality of extreme positions may be based on the amount of the external force applied on the at least the portion of the at least one input device 102.

Further, in some embodiments, the at least one external action may include applying an external force on the at least the portion of the at least one input device 102 and removing the external force from the at least one the portion of the at least one input device 102 after the applying. Further, the rotating of the moving side mirror 100 in the forward direction from the original position to the at least one extreme position may be based on the applying of the external force. Further, the rotating of the moving side mirror 100 in the reverse direction from the at least one extreme position to the original position may be based on the removing of the external force.

FIG. 2 is a top perspective view of the moving side mirror 100 for the vehicle 108, in accordance with some embodiments.

FIG. 3 is a top perspective view of the moving side mirror 100 for the vehicle 108, in accordance with some embodiments.

Figure 4:
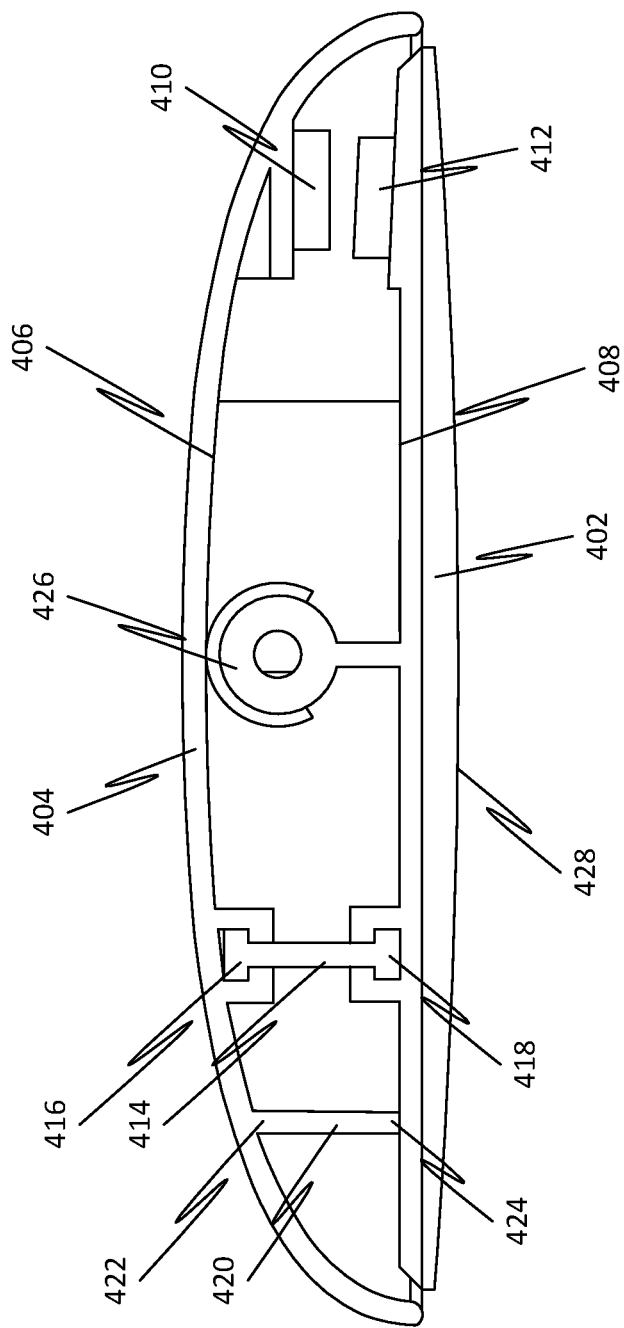
FIG. 4 is a cross-sectional view of a moving side mirror and a moving side mirror holder attached to the moving side mirror for a vehicle, in accordance with some embodiments.

FIG. 4 is a cross-sectional view of a moving side mirror 402 and a moving side mirror holder 404 attached to the moving side mirror 402 for a vehicle, in accordance with some embodiments. Further, the moving side mirror 402 may include at least one input device (not shown) and at least one actuator.

Further, the at least one input device may be configured for receiving at least one external action on at least a portion of the at least one input device.

Further, the at least one actuator may be operationally coupled with the at least one input device. Further, the at least one actuator may be configured for rotating the moving side mirror 402 relative to the vehicle around at least one axis associated with the moving side mirror 402 in a forward direction from an original position of the moving side mirror 402 to at least one extreme position of the moving side mirror 402 based on the receiving of the at least one external action. Further, the at least one actuator may be configured for rotating the moving side mirror 402 relative to the vehicle around the at least one axis in a reverse direction from the at least one extreme position to the original position after a predetermined duration of time based on the rotating of the moving side mirror 402 from the original position to the at least one extreme position. Further, the reverse direction may be opposite to the forward direction.

Further, the moving side mirror holder 404 may be configured to be mounted on the vehicle. Further, the moving side mirror 402 may be rotatably coupled to the moving side mirror holder 404 using a rotating assembly 426 for rotatably mounting the moving side mirror 402 on the vehicle. Further, the rotating assembly 426 may be a revolute joint. Further, the rotating assembly 426 allows at least one of the rotating of the moving side mirror 402 in the forward direction from the original position to the at least one extreme position and the rotating of the moving side mirror 402 in the reverse direction from the at least one extreme position to the original position around the at least one axis of the rotating assembly 426. Further, the moving side mirror 402, in an instance, may include an outer mirror surface 428. Further, the outer mirror surface 428 may be a reflective surface. Further, the moving side mirror 402 forms at least one image of at least one object based on the reflective surface for viewing the at least one object on the outer mirror surface 428 by a user. Further, the user may include an individual driving the vehicle. Further, the at least one object may be present proximal to the vehicle. Further, the at least one object may include at least one first vehicle.

Further, in some embodiments, the at least one actuator may include at least one electromagnet 410 attached to a first holder side of an inner holder surface 406 of the moving side mirror holder 404. Further, the at least one electromagnet 410 may be configured for energizing based on the receiving of the at least one external action. Further, the at least one electromagnet 410 may be configured for attracting at least one iron plate 412 attached to a first mirror side of an inner mirror surface 408 of the moving side mirror 402 based on the energizing. Further, the inner holder surface 406 opposes the inner mirror surface 408. Further, the first holder side opposes the first mirror side. Further, the at least one of the rotating of the moving side mirror 402 in the forward direction from the original position to the at least one extreme position and the rotating of the moving side mirror 402 in the reverse direction from the at least one extreme position to the original position may be based on the attracting. Further, in an embodiment, the at least one electromagnet 410 may be configured for de-energizing after the at least one of the rotating of the moving side mirror 402 in the forward direction from the original position to the at least one extreme position and the rotating of the moving side mirror 402 in the reverse direction from the at least one extreme position to the original position. Further, the at least one electromagnet 410 does not attract the at least one iron plate 412 after the de-energizing. Further, in an embodiment, a spring 414 may be coupled to the moving side mirror 402. Further, the spring 414 may include a first spring end 416 and a second spring end 418. Further, the first spring end 416 may be attached to a second holder side of the inner holder surface 406 and the second spring end 418 may be attached to a second mirror side of the inner mirror surface 408. Further, the second holder side opposes the second mirror side. Further, the spring 414 may be associated with a natural state and at least one extended state. Further, the spring 414 transitions from the natural state to the at least one extended state based on the rotating of the moving side mirror 402 in the forward direction from the original position to the at least one extreme position. Further, the spring 414 may be configured for retracting from the at least one extended state to the natural state based on the de-energizing. Further, the rotating of the moving side mirror 402 in the reverse direction from the at least one extreme position to the original position may be based on the retracting. Further, a stopper 420 may be coupled to the moving side mirror 402. Further, the stopper 420 may include a first stopper end 422 and a second stopper end 424. Further, the first stopper end 422 may be attached to the inner holder surface 406. Further, the second stopper end 424 extends towards the inner mirror surface 408. Further, the stopper 420 may be configured for preventing the rotating of the moving side mirror 402 in the forward direction from the original position to the at least one extreme position after the de-energizing of the at least one electromagnet 410 by supporting the moving side mirror 402 on the second stopper end 424.

Further, in some embodiments, the at least one actuator may include a solenoid. Further, a first end of a plunger of the solenoid may be attached to the inner mirror surface 408 of the moving side mirror 402. Further, the solenoid may be configured for retractably moving the plunger between at least one extended position and a retracted position based on the receiving of the at least one external action. Further, the at least one of the rotating of the moving side mirror 402 in the forward direction from the original position to the at least one extreme position and the rotating of the moving side mirror 402 in the reverse direction from the at least one extreme position to the original position may be based on the retractably moving.

Further, in some embodiments, the at least one actuator may include a hydraulic assembly. Further, a first end of a shaft of the hydraulic assembly may be attached to the inner mirror surface 408 of the moving side mirror 402. Further, the hydraulic assembly may be configured for retractably moving the shaft between at least one extended position and a retracted position based on the receiving of the at least one external action. Further, the at least one of the rotating of the moving side mirror 402 in the forward direction from the original position to the at least one extreme position and the rotating of the moving side mirror 402 in the reverse direction from the at least one extreme position to the original position may be based on the retractably moving.

Further, in some embodiments, the at least one actuator may include a motor. Further, a shaft of the motor may be mechanically coupled with the rotating assembly 426. Further, the motor may be configured for reversibly rotating the shaft between a first position and at least one second position based on the receiving of the at least one external action. Further, the at least one of the rotating of the moving side mirror 402 in the forward direction from the original position to the at least one extreme position and the rotating of the moving side mirror 402 in the reverse direction from the at least one extreme position to the original position may be based on the reversibly rotating.

Further, in some embodiments, the at least one actuator may include a spring and a lever. Further, a first end of the lever may be coupled with the at least one input device and a second end of the lever may be coupled to the moving side mirror 402. Further, a first spring end of the spring may be attached to the inner holder surface 406 of the moving side mirror holder 404 and a second spring end of the spring may be attached to the inner mirror surface 408 of the moving side mirror 402. Further, the lever may be configured for rotating around a lever axis associated with the second end from a first lever position to at least one second lever position based on the at least one external action received on the first end. Further, the lever axis may be perpendicular to the lever. Further, the rotating of the moving side mirror 402 in the forward direction from the original position to the at least one extreme position may be based on the rotating of the lever around the lever axis from the first lever position to the at least one second lever position. Further, the spring transitions from a natural state to at least one extended state based on the rotating of the moving side mirror 402 in the forward direction from the original position to the at least one extreme position. Further, the spring may be configured for retracting from the at least one extended state to the natural state. Further, the lever may be configured for rotating around the lever axis from the at least one second lever position to the first lever position based on the retracting. Further, the rotating of the moving side mirror 402 in the reverse direction from the at least one extreme position to the original position may be based on the rotating of the lever around the lever axis from the at least one second lever position to the first lever position.

Further, in some embodiments, the at least one extreme position may include a plurality of extreme positions. Further, the at least one external action may include a plurality of external actions. Further, the plurality of external actions may be characterized by an amount of an external force applied on the at least the portion of the at least one input device. Further, the rotating of the moving side mirror 402 around the at least one axis in the forward direction from the original position to the plurality of extreme positions may be based on the amount of the external force applied on the at least the portion of the at least one input device.

Further, in some embodiments, the at least one external action may include applying an external force on the at least the portion of the at least one input device and removing the external force from the at least one the portion of the at least one input device after the applying. Further, the rotating of the moving side mirror 402 in the forward direction from the original position to the at least one extreme position may be based on the applying of the external force. Further, the rotating of the moving side mirror 402 in the reverse direction from the at least one extreme position to the original position may be based on the removing of the external force.

Figure 5:
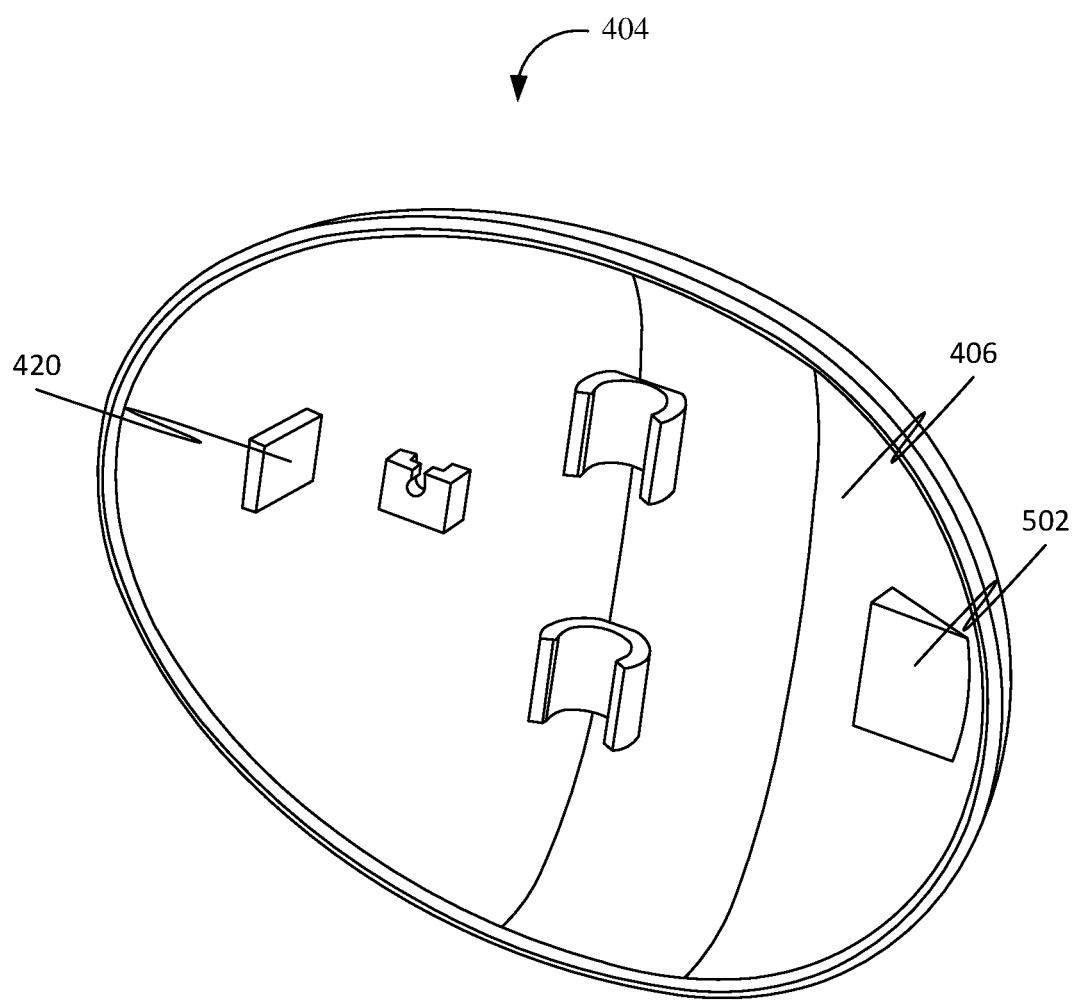
FIG. 5 is a front perspective view of the moving side mirror holder, in accordance with some embodiments.

FIG. 5 is a front perspective view of the moving side mirror holder 404, in accordance with some embodiments. Further, the moving side mirror holder 404 may include at least one electromagnet holder 502 for attaching the at least one electromagnet 410 to the inner holder surface 406 of the moving side mirror holder 404.

Figure 6:
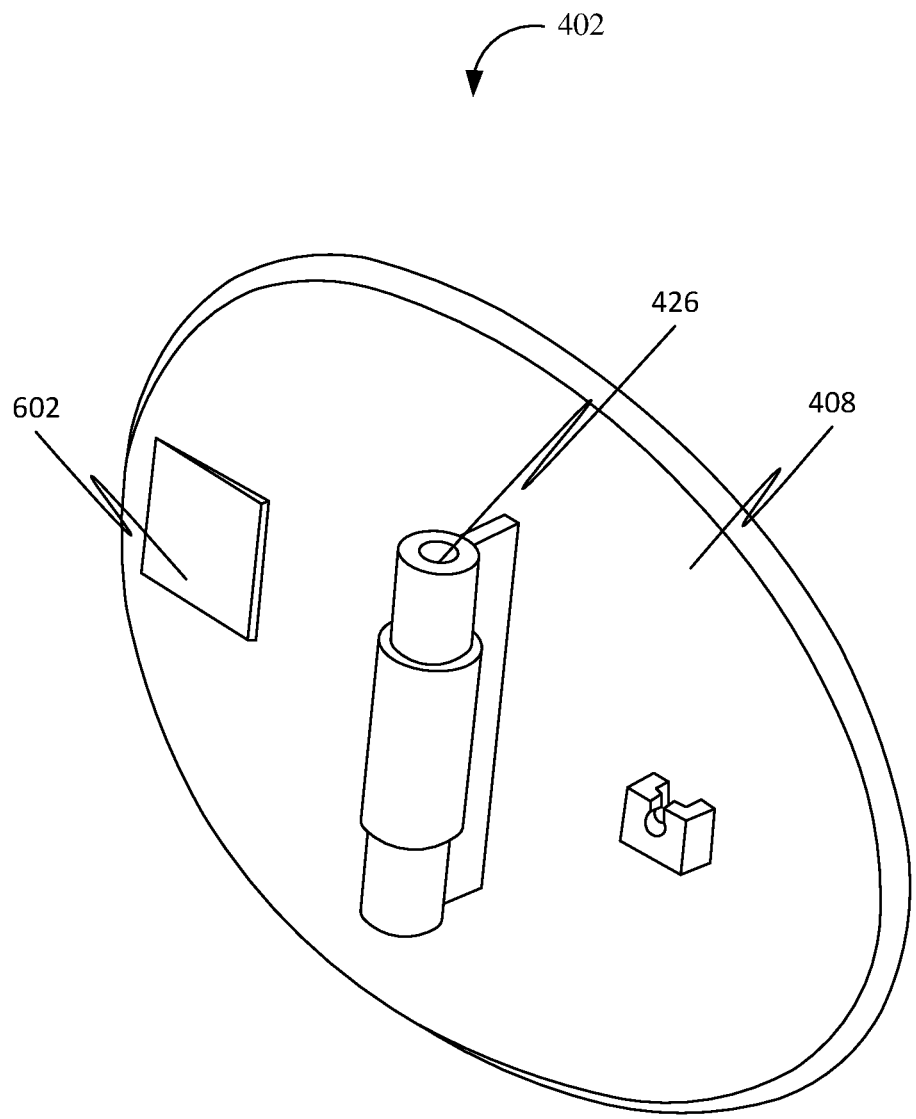
FIG. 6 is a rear perspective view of the moving side mirror, in accordance with some embodiments.

FIG. 6 is a rear perspective view of the moving side mirror 402, in accordance with some embodiments. Further, the moving side mirror 402 may include at least one iron plate holder 602 for attaching the at least one iron plate 412 to the inner mirror surface 408 of the moving side mirror 402.

Figure 7:
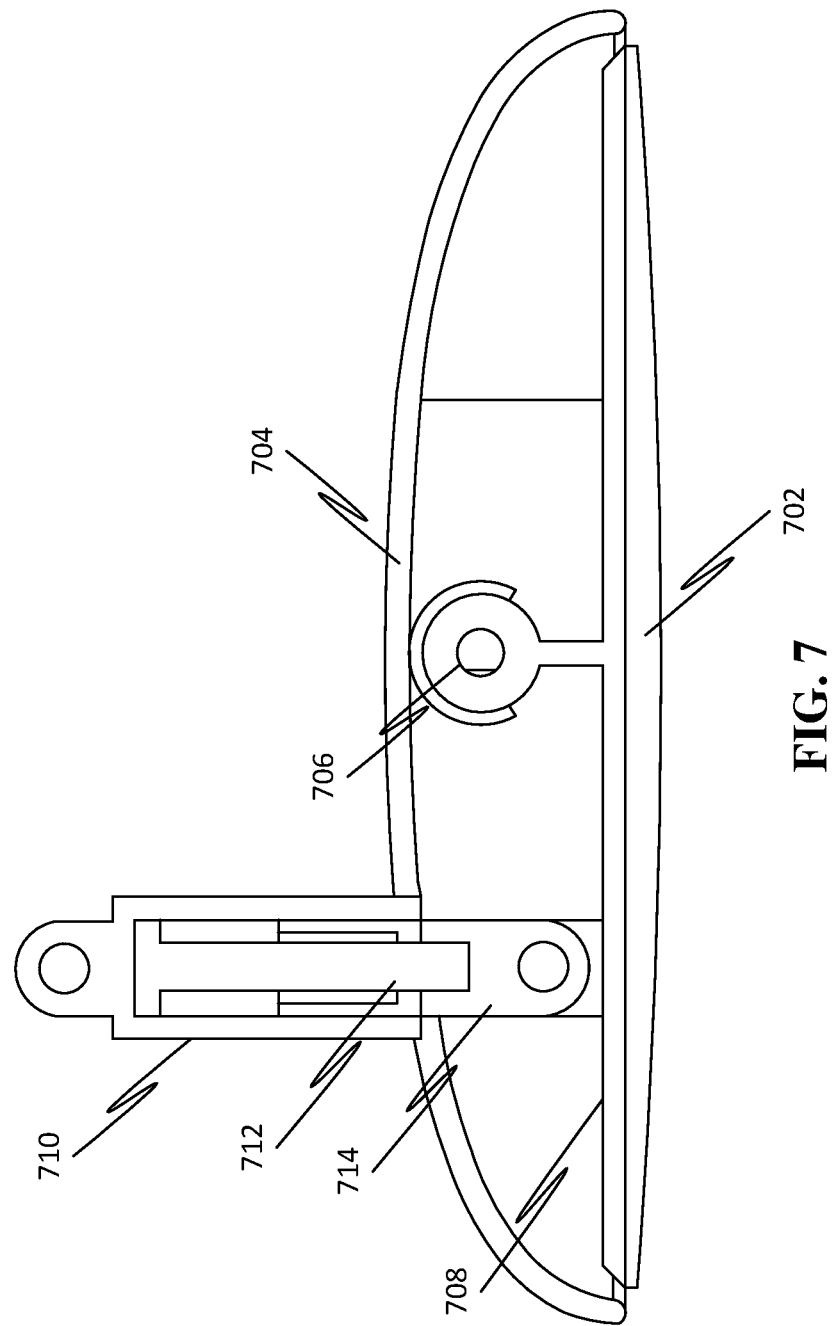
FIG. 7 is a cross-sectional view of a moving side mirror and a moving side mirror holder attached to the moving side mirror for a vehicle, in accordance with some embodiments.

FIG. 7 is a cross-sectional view of a moving side mirror 702 and a moving side mirror holder 704 attached to the moving side mirror 702 for a vehicle, in accordance with some embodiments. Further, the moving side mirror 702 may include at least one input device (not shown) and at least one actuator. Further, the moving side mirror 702 may be rotatably coupled to the moving side mirror holder 704 using a rotating assembly 706 for rotatably mounting the moving side mirror 702 on the vehicle. Further, the rotating assembly 706 may be a revolute joint. Further, the at least one actuator may include a solenoid 710. Further, a first end 714 of a plunger 712 of the solenoid 710 may be attached to an inner mirror surface 708 of the moving side mirror 702.

Figure 8:
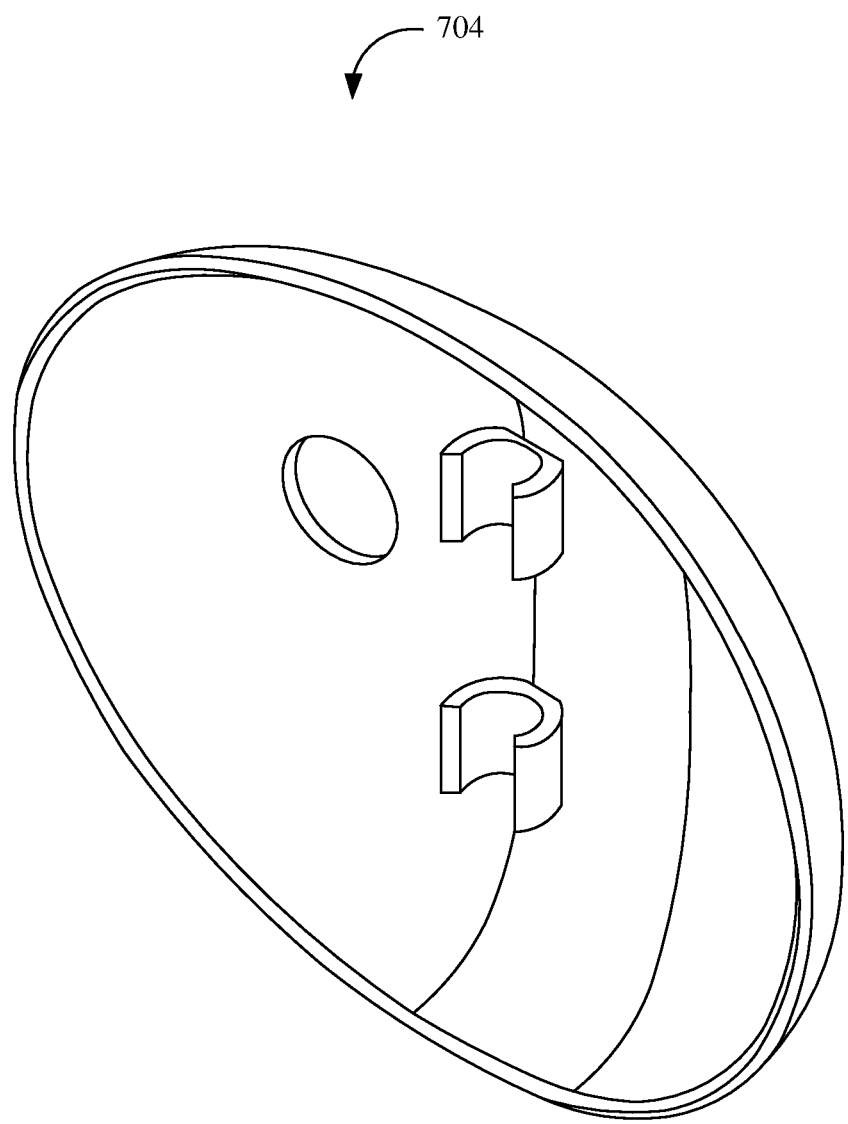
FIG. 8 is a front perspective view of the moving side mirror holder, in accordance with some embodiments.

FIG. 8 is a front perspective view of the moving side mirror holder 704, in accordance with some embodiments.

Figure 9:
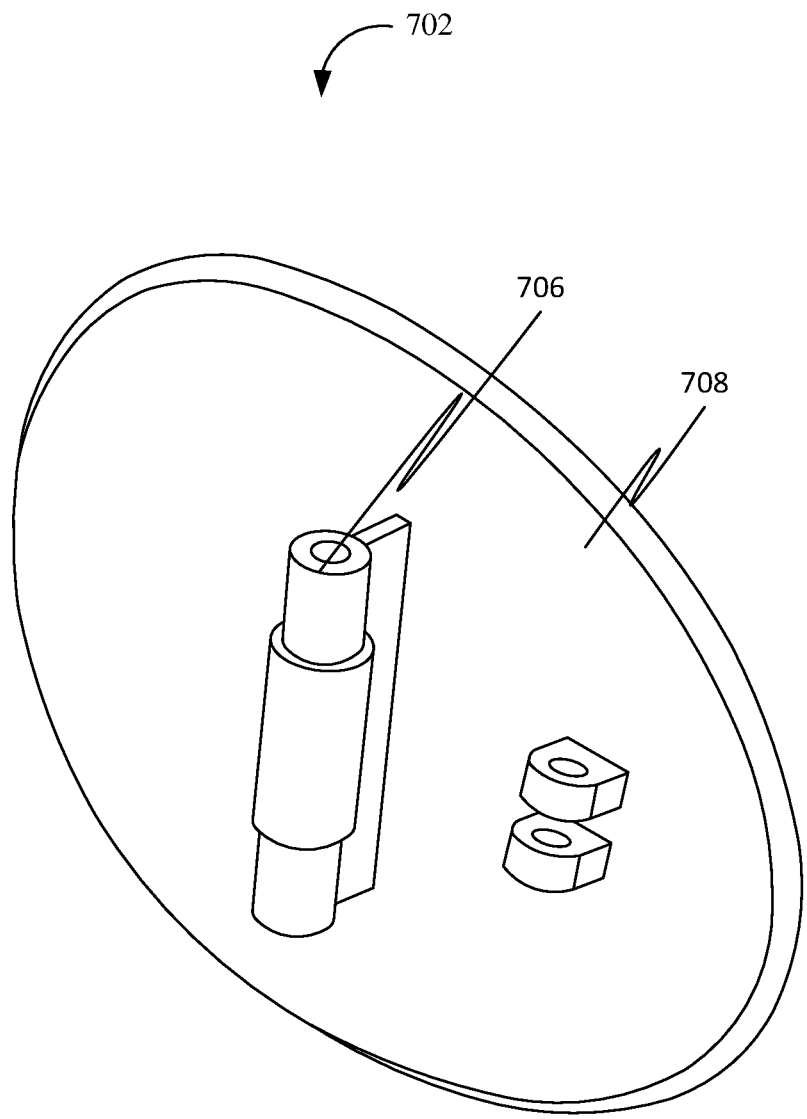
FIG. 9 is a rear perspective view of the moving side mirror, in accordance with some embodiments.

FIG. 9 is a rear perspective view of the moving side mirror 702, in accordance with some embodiments.

Figure 10:
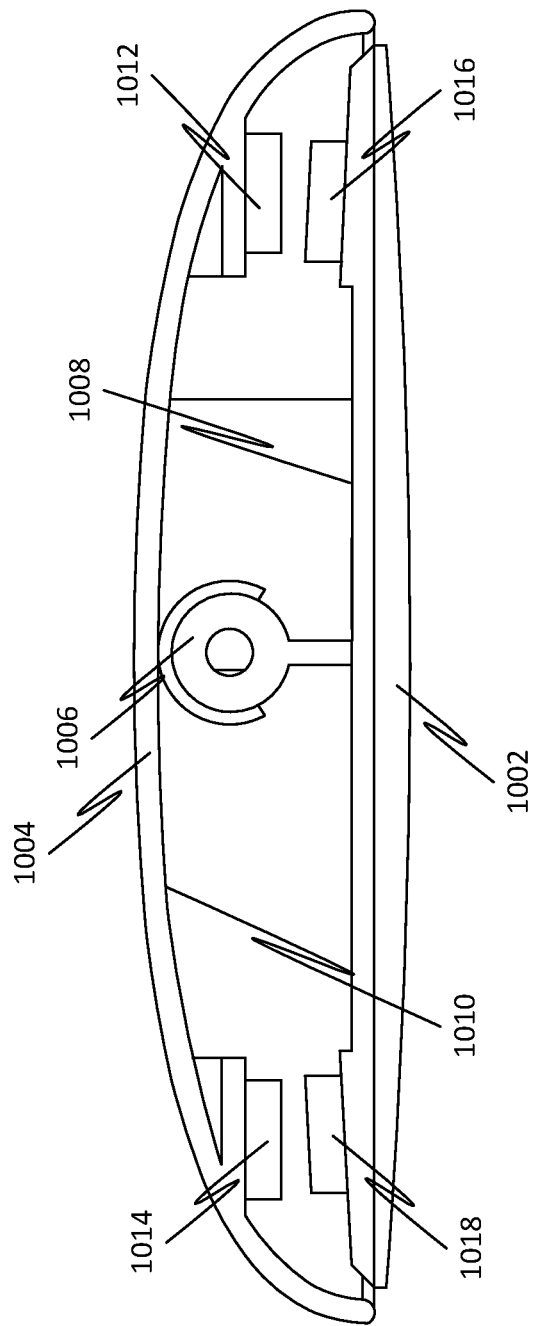
FIG. 10 is a cross-sectional view of a moving side mirror and a moving side mirror holder attached to the moving side mirror for a vehicle, in accordance with some embodiments.

FIG. 10 is a cross-sectional view of a moving side mirror 1002 and a moving side mirror holder 1004 attached to the moving side mirror 1002 for a vehicle, in accordance with some embodiments. Further, the moving side mirror 1002 may include at least one input device (not shown) and at least one actuator. Further, the moving side mirror 1002 may be rotatably coupled to the moving side mirror holder 1004 using a rotating assembly 1006 for rotatably mounting the moving side mirror 1002 on the vehicle. Further, the rotating assembly 1006 may be a revolute joint. Further, the at least one actuator may include a first electromagnet 1012 and a second electromagnet 1014. Further, the first electromagnet 1012 may be attached to a first holder side of an inner holder surface 1010 of the moving side mirror holder 1004 and the second electromagnet 1014 may be attached to a second side of the inner holder surface 1010 of the moving side mirror holder 1004. Further, the first electromagnet 1012 may be configured for attracting a first iron plate 1016 attached to a first mirror side of an inner mirror surface 1008 of the moving side mirror 1002 and the second electromagnet 1014 may be configured for attracting a second iron plate 1018 attached to a second mirror side of the inner mirror surface 1008 of the moving side mirror 1002.

Figure 11:
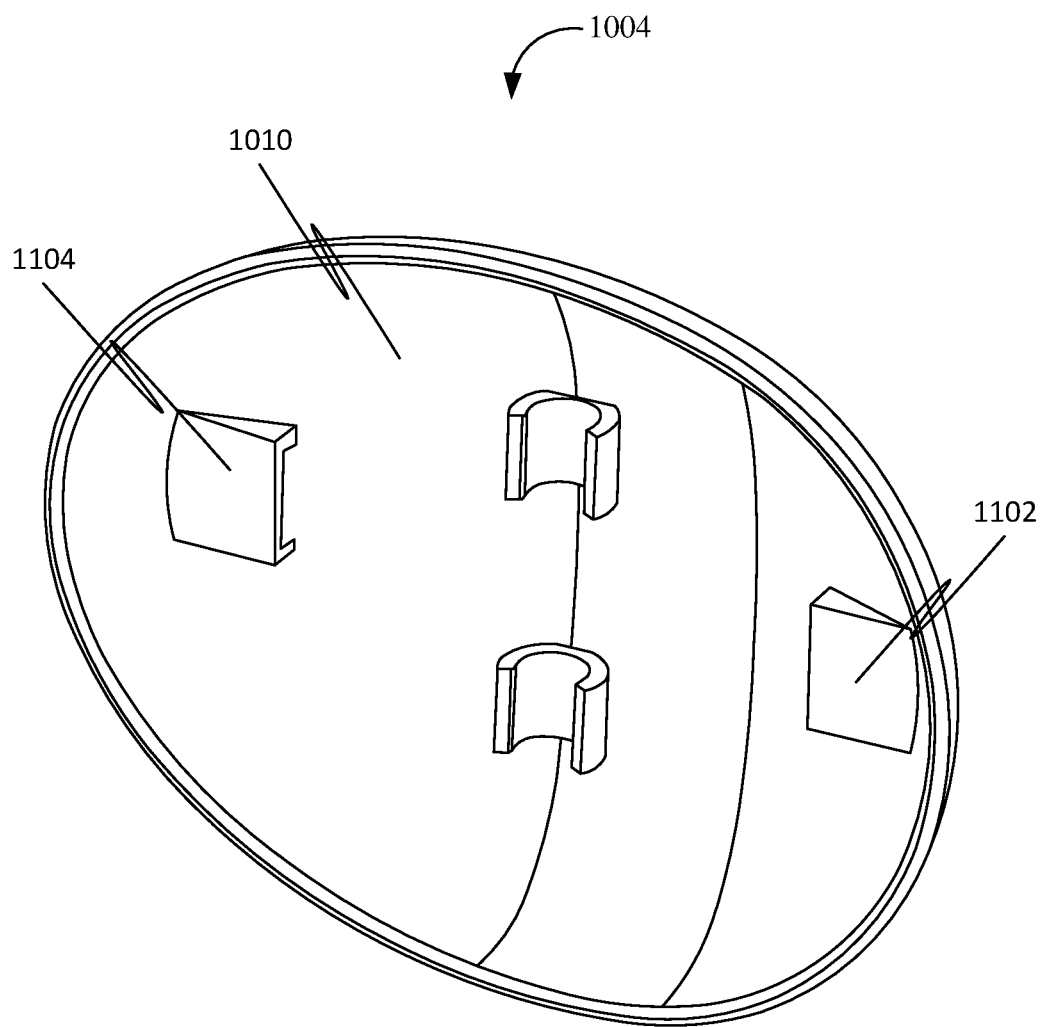
FIG. 11 is a front perspective view of the moving side mirror holder, in accordance with some embodiments.

FIG. 11 is a front perspective view of the moving side mirror holder 1004, in accordance with some embodiments. Further, the moving side mirror holder 1004 may include a first electromagnet holder 1102 and a second electromagnet holder 1104. Further, the first electromagnet holder 1102 attaches the first electromagnet 1012 to the inner holder surface 1010 of the moving side mirror holder 1004 and the second electromagnet holder 1104 attaches the second electromagnet 1014 to the inner holder surface 1010 of the moving side mirror holder 1004.

Figure 12:
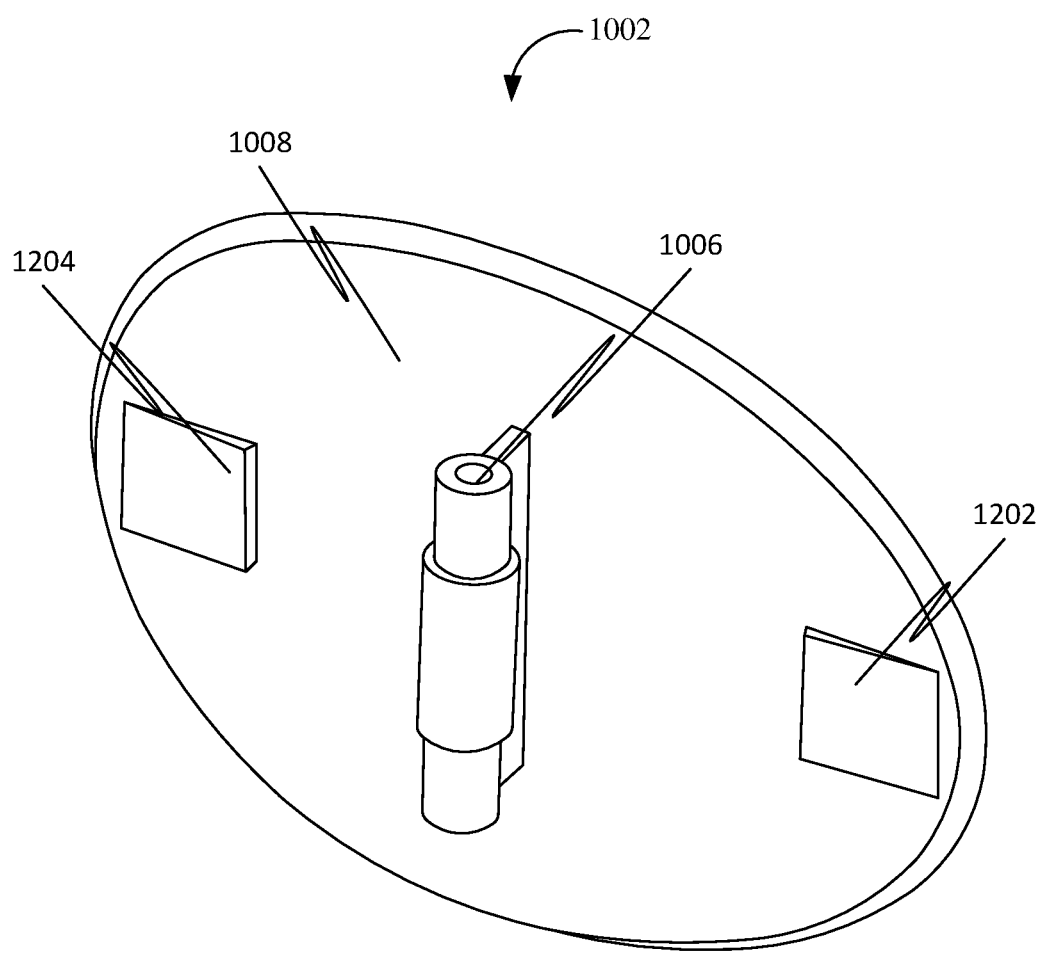
FIG. 12 is a rear perspective view of the moving side mirror, in accordance with some embodiments.

FIG. 12 is a rear perspective view of the moving side mirror 1002, in accordance with some embodiments. Further, the moving side mirror 1002 may include a first iron plate holder 1202 and a second iron plate holder 1204. Further, the first iron plate holder 1202 attaches the first iron plate 1016 to the inner mirror surface 1008 of the moving side mirror 1002 and the second iron plate holder 1204 attaches the second iron plate 1018 to the inner mirror surface 1008 of the moving side mirror 1002.

Figure 13:
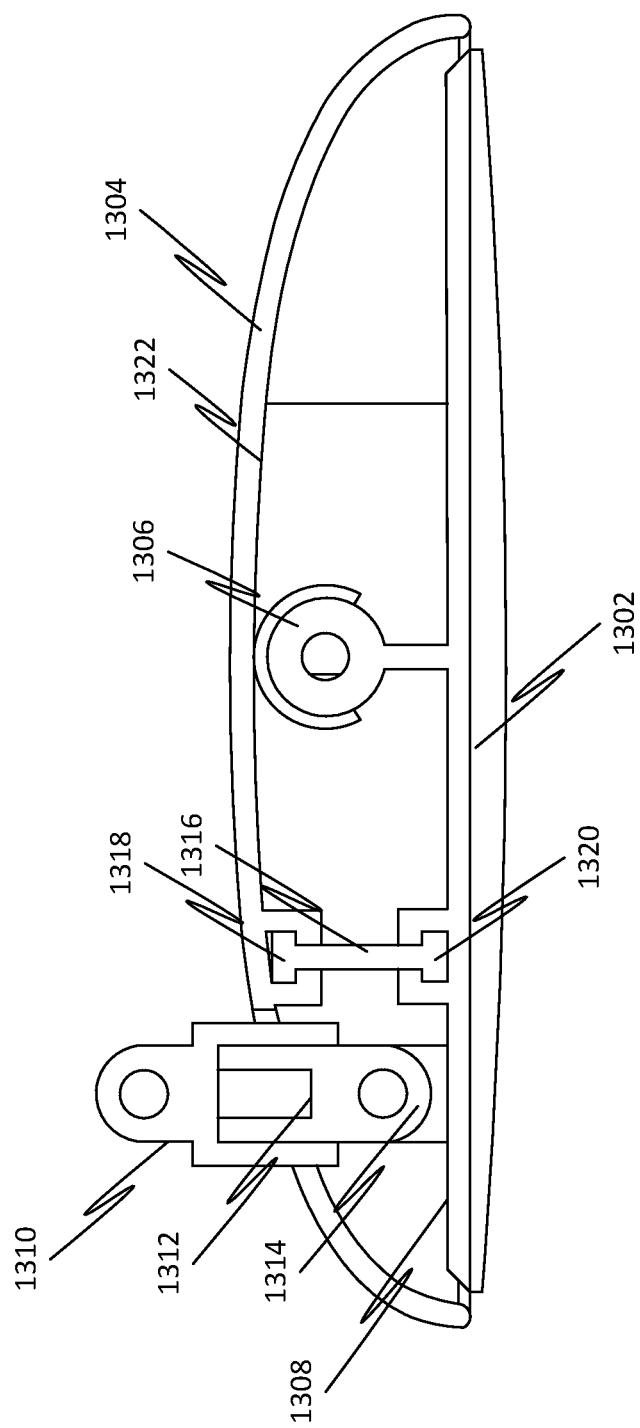
FIG. 13 is a cross-sectional view of a moving side mirror and a moving side mirror holder attached to the moving side mirror for a vehicle, in accordance with some embodiments.

FIG. 13 is a cross-sectional view of a moving side mirror 1302 and a moving side mirror holder 1304 attached to the moving side mirror 1302 for a vehicle, in accordance with some embodiments. Further, the moving side mirror 1302 may include at least one input device (not shown), at least one actuator, and a spring 1316. Further, the moving side mirror 1302 may be rotatably coupled to the moving side mirror holder 1304 using a rotating assembly 1306 for rotatably mounting the moving side mirror 1302 on the vehicle. Further, the rotating assembly 1306 may be a revolute joint. Further, the at least one actuator may include a hydraulic assembly 1310. Further, a first end 1314 of a shaft 1312 of the hydraulic assembly 1310 may be attached to an inner mirror surface 1308 of the moving side mirror 1302. Further, the spring 1316 may be coupled to the moving side mirror 1302. Further, the spring 1316 may include a first spring end 1318 and a second spring end 1320. Further, the first spring end 1318 may be attached to an inner holder surface 1322 of the moving side mirror holder 1304 and the second spring end 1320 may be attached to the inner mirror surface 1308.

Figure 14:
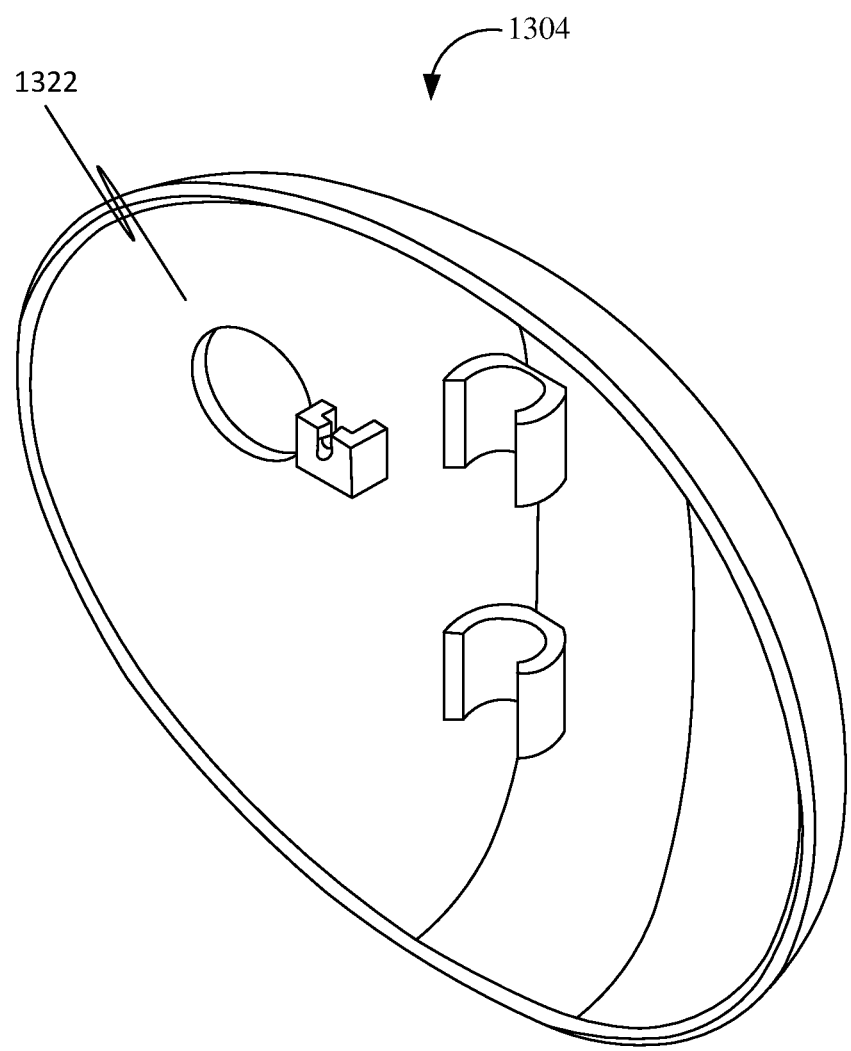
FIG. 14 is a front perspective view of the moving side mirror holder, in accordance with some embodiments.

FIG. 14 is a front perspective view of the moving side mirror holder 1304, in accordance with some embodiments.

Figure 15:
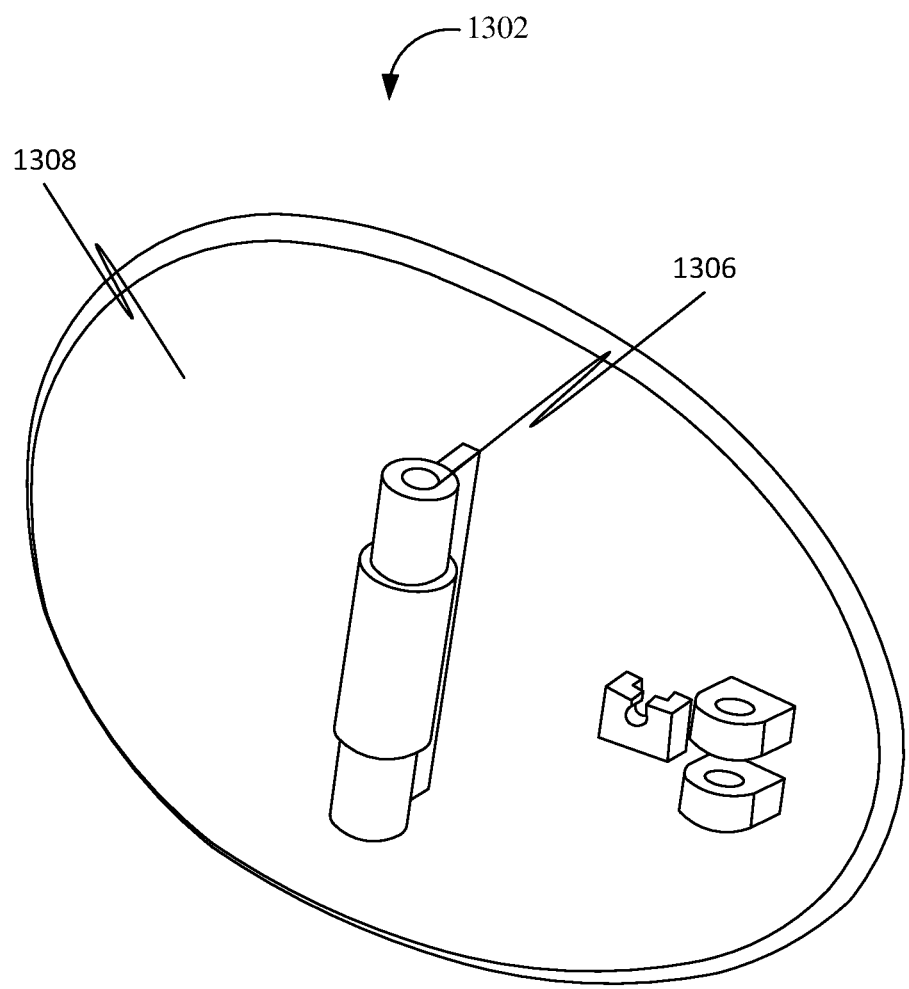
FIG. 15 is a rear perspective view of the moving side mirror, in accordance with some embodiments.

FIG. 15 is a rear perspective view of the moving side mirror 1302, in accordance with some embodiments.

Figure 16:
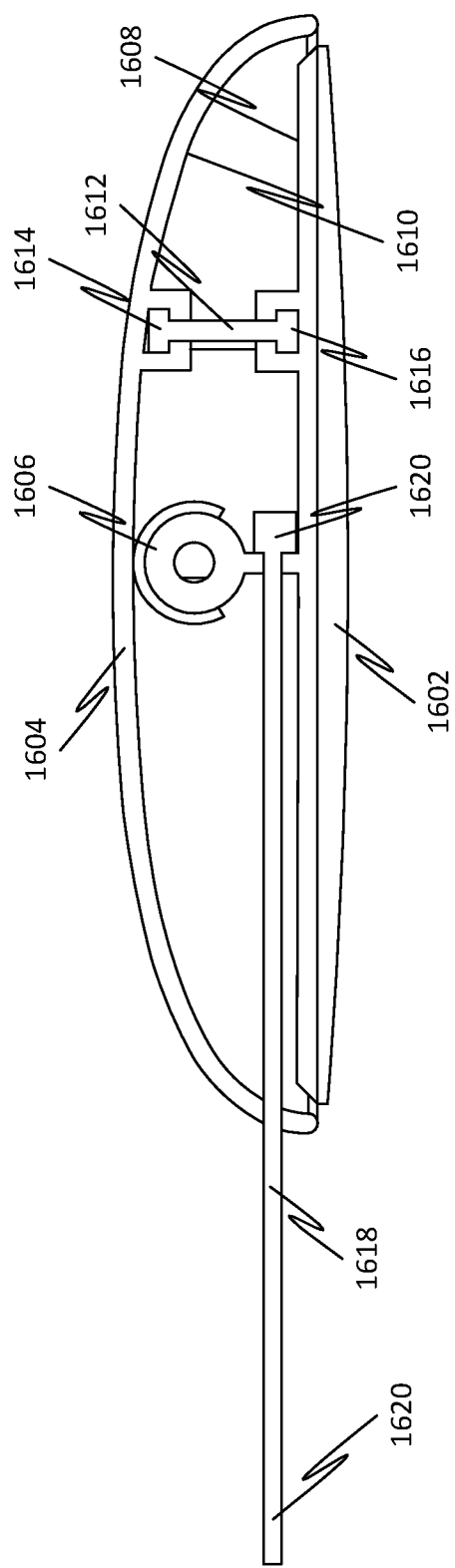
FIG. 16 is a cross-sectional view of a moving side mirror and a moving side mirror holder attached to the moving side mirror for a vehicle, in accordance with some embodiments.

FIG. 16 is a cross-sectional view of a moving side mirror 1602 and a moving side mirror holder 1604 attached to the moving side mirror 1602 for a vehicle, in accordance with some embodiments. Further, the moving side mirror 1602 may include at least one input device (not shown) and at least one actuator. Further, the moving side mirror 1602 may be rotatably coupled to the moving side mirror holder 1604 using a rotating assembly 1606 for rotatably mounting the moving side mirror 1602 on the vehicle. Further, the rotating assembly 1606 may be a revolute joint. Further, the at least one actuator may include a spring 1612 and a lever 1618. Further, the lever 1618 may include a wire comprised of at least one material. Further, the at least one material mat include metal, plastic, etc. Further, the wire may include a metal wire, a stainless steel wire, a plastic wire, etc. Further, a first end 1620 of the lever 1618 may be coupled with the at least one input device and a second end 1622 of the lever 1618 may be coupled to the moving side mirror 1602. Further, a first spring end 1614 of the spring 1612 may be attached to an inner holder surface 1610 of the moving side mirror holder 1604 and a second spring end 1616 of the spring 1612 may be attached to an inner mirror surface 1608 of the moving side mirror 1602.

Figure 17:
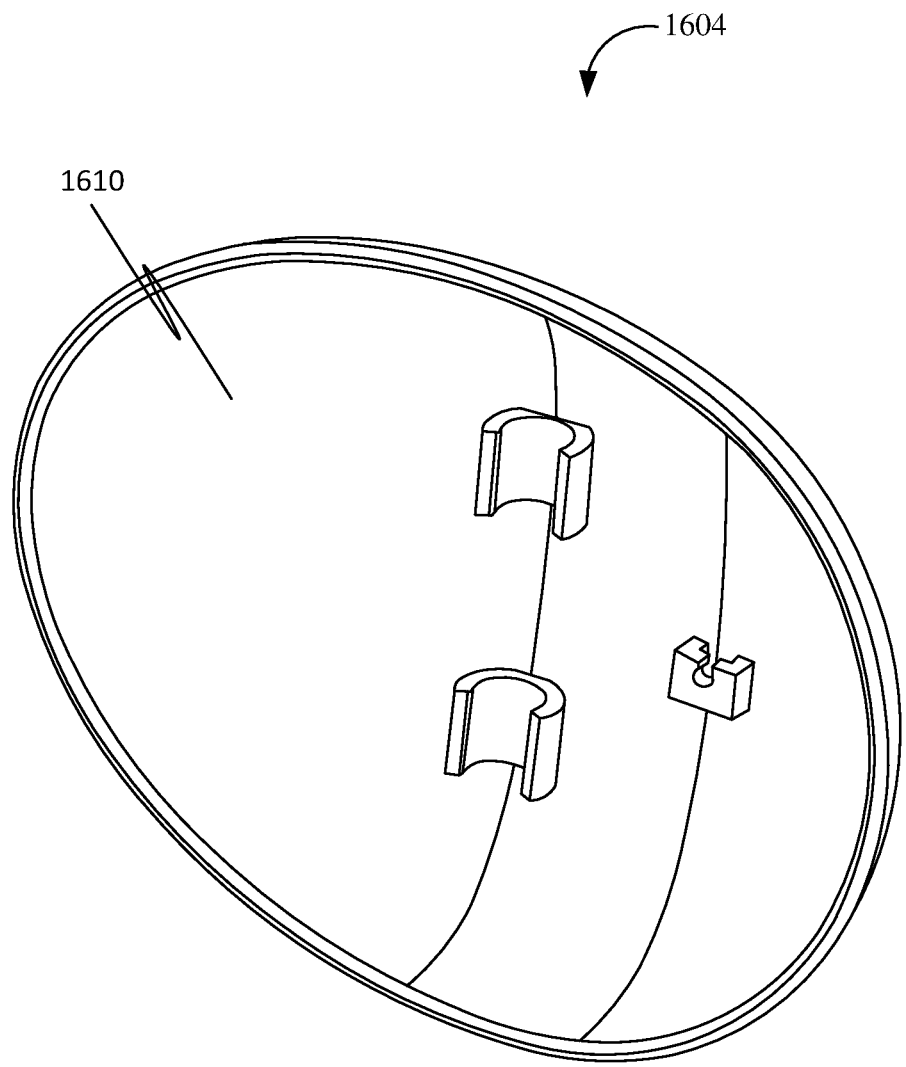
FIG. 17 is a front perspective view of the moving side mirror holder, in accordance with some embodiments.

FIG. 17 is a front perspective view of the moving side mirror holder 1604, in accordance with some embodiments.

Figure 18:
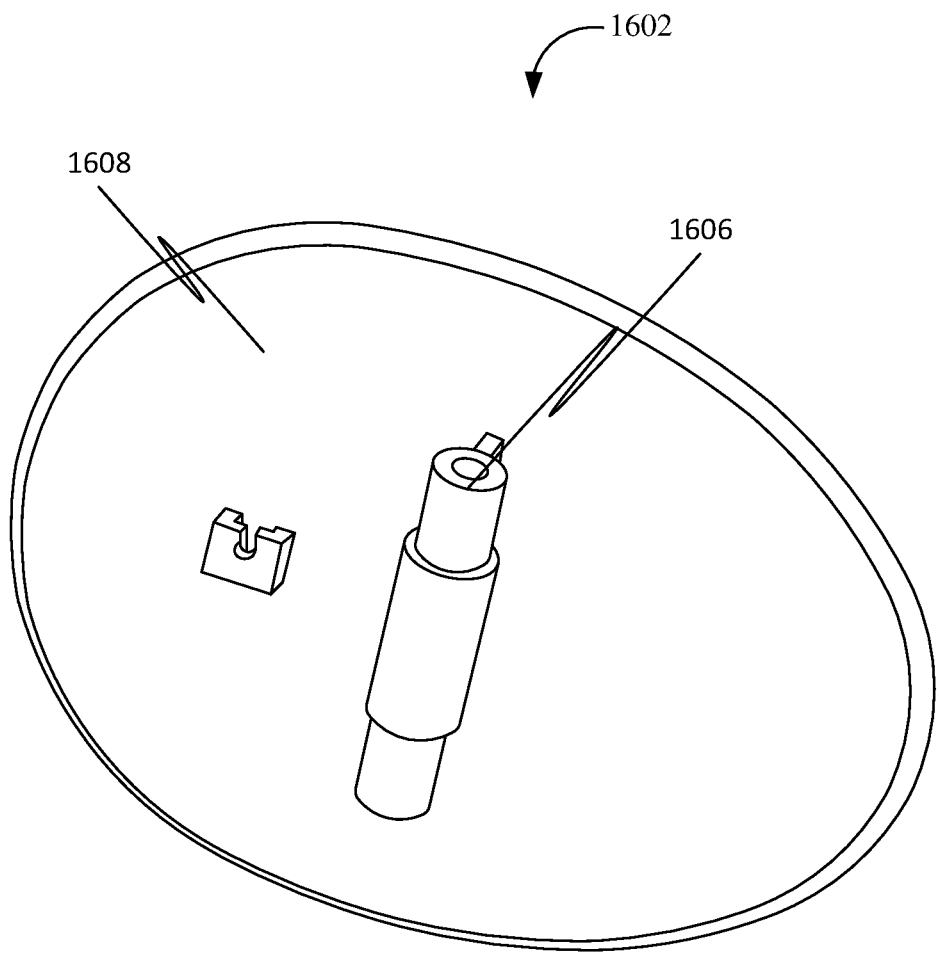
FIG. 18 is a rear perspective view of the moving side mirror, in accordance with some embodiments.

FIG. 18 is a rear perspective view of the moving side mirror 1602, in accordance with some embodiments.

Figure 19:
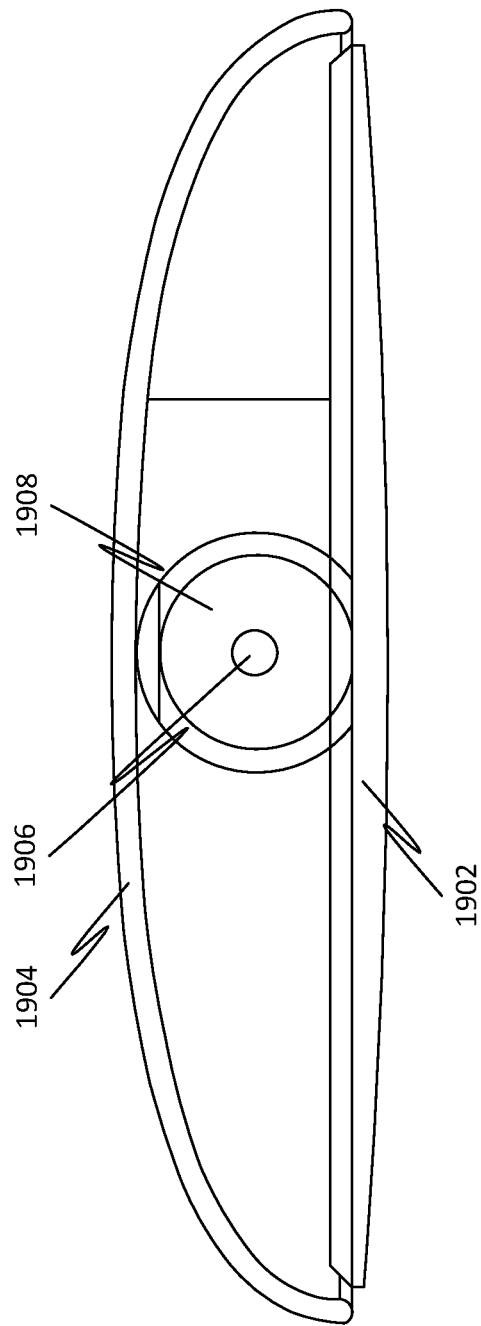
FIG. 19 is a cross-sectional view of a moving side mirror and a moving side mirror holder attached to the moving side mirror for a vehicle, in accordance with some embodiments.

FIG. 19 is a cross-sectional view of a moving side mirror 1902 and a moving side mirror holder 1904 attached to the moving side mirror 1902 for a vehicle, in accordance with some embodiments. Further, the moving side mirror 1902 may include at least one input device (not shown) and at least one actuator. Further, the moving side mirror 1902 may be rotatably coupled to the moving side mirror holder 1904 using a rotating assembly 1906 for rotatably mounting the moving side mirror 1902 on the vehicle. Further, the rotating assembly 1906 may be a revolute joint. Further, the at least one actuator may include a motor 1908. Further, a shaft of the motor 1908 may be mechanically coupled with the rotating assembly 1906.

Figure 20:
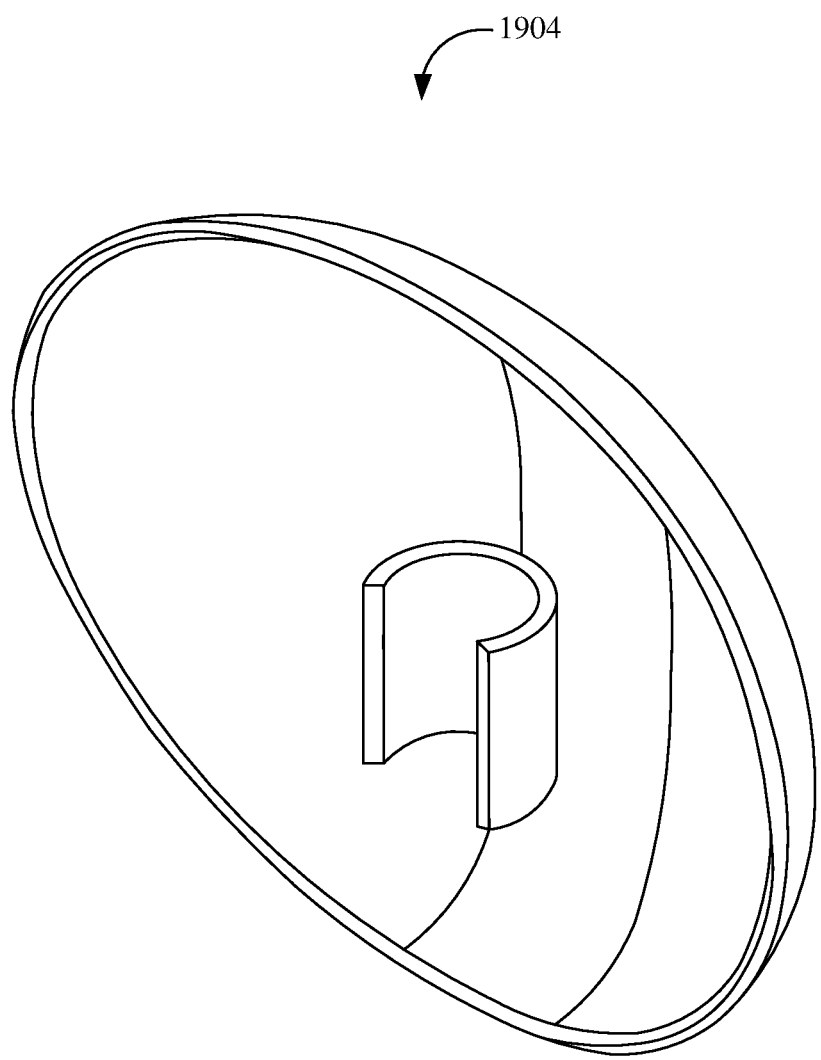
FIG. 20 is a front perspective view of the moving side mirror holder, in accordance with some embodiments.

FIG. 20 is a front perspective view of the moving side mirror holder 1904, in accordance with some embodiments.

Figure 21:
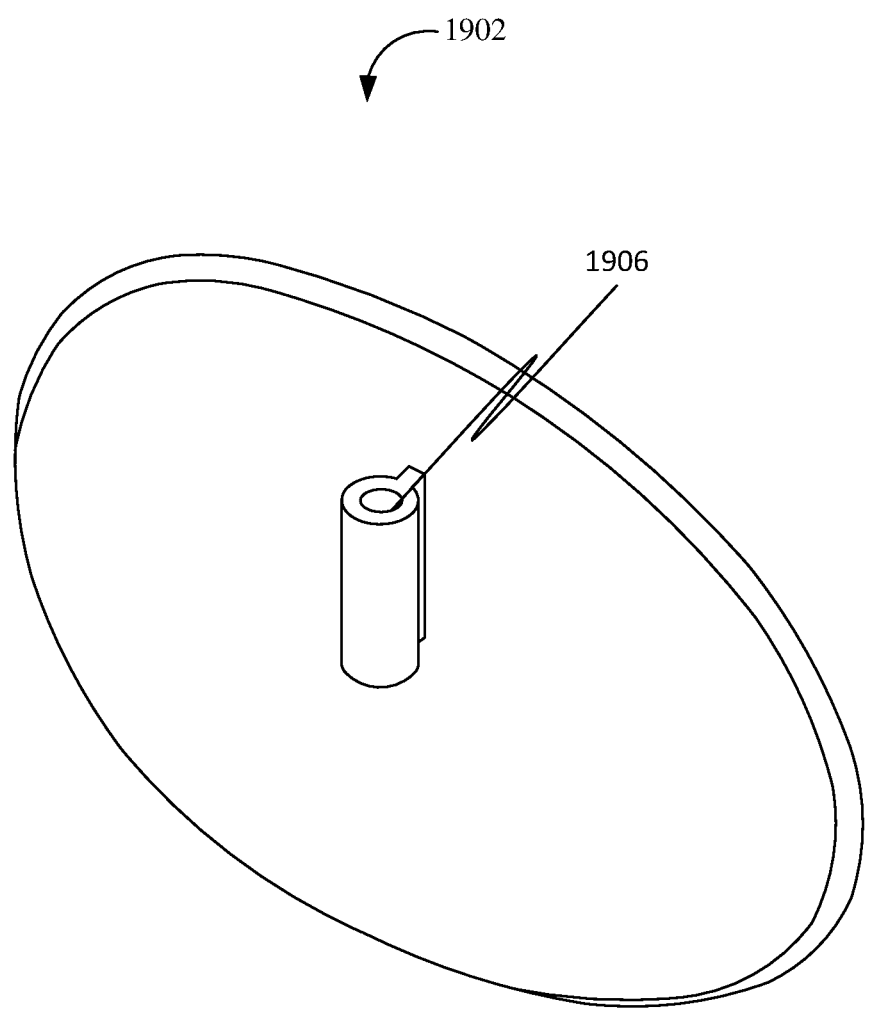
FIG. 21 is a rear perspective view of the moving side mirror, in accordance with some embodiments.

FIG. 21 is a rear perspective view of the moving side mirror 1902, in accordance with some embodiments.

Although the present disclosure has been explained in relation to its preferred embodiment, it is to be understood that many other possible modifications and variations can be made without departing from the spirit and scope of the disclosure.

What is claimed is:

1. A moving side mirror for a vehicle, wherein the moving side mirror is configured to be rotatably mounted on the vehicle, wherein the moving side mirror comprises:
    an outer mirror surface for viewing at least one object by a user;
    at least one input device configured for receiving at least one external action on at least a portion of the at least one input device; and
    at least one actuator operationally coupled with the at least one input device, wherein the at least one actuator is configured for:
        rotating the outer mirror surface relative to the vehicle around at least one axis associated with the moving side mirror in a forward direction from an original position of the outer mirror surface to at least one extreme position of the moving side mirror based on the receiving of the at least one external action; and rotating the outer mirror surface relative to the vehicle around the at least one axis in a reverse direction from the at least one extreme position to the original position after a predetermined duration of time based on the rotating of the outer mirror surface from the original position to the at least one extreme position, wherein the reverse direction is opposite to the forward direction;

a moving side mirror holder configured to be mounted on the vehicle, wherein the outer mirror surface is rotatably coupled to the moving side mirror holder using a rotating assembly for rotatably mounting the moving side mirror, wherein the rotating assembly allows at least one of the rotating of the outer mirror surface in the forward direction from the original position to the at least one extreme position and the rotating of the outer mirror surface in the reverse direction from the at least one extreme position to the original position around the at least one axis of the rotating assembly;

wherein the at least one actuator comprises:

a spring; and a lever, wherein a first end of the lever is coupled with the at least one input device and a second end of the lever is coupled to the outer mirror surface, wherein a first spring end of the spring is attached to an inner holder surface of the moving side mirror holder and a second spring end of the spring is attached to an inner mirror surface of the moving side mirror, wherein the lever is configured for rotating around a lever axis associated with the second end from a first lever position to at least one second lever position based on the at least one external action received on the first end, wherein the lever axis is perpendicular to the lever, wherein the rotating of the outer mirror surface in the forward direction from the original position to the at least one extreme position is further based on the rotating of the lever around the lever axis from the first lever position to the at least one second lever position, wherein the spring transitions from a natural state to at least one extended state based on the rotating of the outer mirror surface in the forward direction from the original position to the at least one extreme position, wherein the spring is configured for retracting from the at least one extended state to the natural state, wherein the lever is configured for rotating around the lever axis from the at least one second lever position to the first lever position based on the retracting, wherein the rotating of the outer mirror surface in the reverse direction from the at least one extreme position to the original position is further based on the rotating of the lever around the lever axis from the at least one second lever position to the first lever position.

2. The moving side mirror of claim 1 further comprising a mounting assembly configured for mounting the moving side mirror on the vehicle, wherein the mounting assembly allows at least one of the rotating of the outer mirror surface in the forward direction from the original position to the at least one extreme position and the rotating of the outer mirror surface in the reverse direction from the at least one extreme position to the original position around the at least one axis.

3. The moving side mirror of claim 1, wherein the rotating of the outer mirror surface in the forward direction is associated with a forward rotating speed and the rotating of the outer mirror surface in the reverse direction is associated with a reverse rotating speed.

4. The moving side mirror of claim 3, wherein the forward rotating speed of the outer mirror surface is equal to the reverse rotating speed of the moving side mirror.

5. The moving side mirror of claim 3, wherein the forward rotating speed of the outer mirror surface is slower than the reverse rotating speed of the outer mirror surface.

6. The moving side mirror of claim 3, wherein the forward rotating speed of the outer mirror surface is faster than the reverse rotating speed of the outer mirror surface.

7. The moving side mirror of claim 3 further comprising a controller communicatively coupled with the at least one input device, wherein the at least one input device is further configured for generating at least one signal based on the receiving of the at least one external action, wherein the controller is configured for:

analyzing the at least one signal; and determining the forward rotating speed and the reverse rotating speed based on the analyzing of the at least one signal, wherein the at least one actuator is communicatively coupled with the controller, wherein the rotating of the outer mirror surface in the forward direction with the forward rotating speed and the rotating of the outer mirror surface in the reverse direction with the reverse rotating speed is based on the determining the forward rotating speed and the reverse rotating speed.

8. The moving side mirror of claim 1 further comprising a controller communicatively coupled with the at least one input device, wherein the at least one input device is further configured for generating at least one signal based on the receiving of the at least one external action, wherein the controller is configured for:

analyzing the at least one signal; and determining the predetermined duration of time based on the analyzing, wherein the at least one actuator is communicatively coupled with the controller, wherein the rotating of the outer mirror surface in the reverse direction from the at least one extreme position to the original position after the predetermined duration of time is further based on the determining.

9. The moving side mirror of claim 1 further comprising:

at least one sensor configured for generating at least one sensor data based on a position of at least one object in relation to the vehicle;

a controller communicatively coupled with the at least one sensor, wherein the controller is configured for:

analyzing the at least one sensor data;

determining a viewability of the at least one object for a user in the moving side mirror based on the analyzing; and generating a command based on the determining of the viewability, wherein the controller is communicatively coupled with the at least one actuator, wherein at least one of the rotating of the outer mirror surface in the forward direction from the original position to the at least one extreme position and the rotating of the outer mirror surface in the reverse direction from the at least one extreme position to the original position is based on the command.

10. The moving side mirror of claim 1, wherein the at least one actuator comprises at least one electromagnet attached to a first holder side of an inner holder surface of the moving side mirror holder, wherein the at least one electromagnet is configured for energizing based on the receiving of the at least one external action, wherein the at least one electromagnet is configured for attracting at least one iron plate attached to a first mirror side of an inner mirror surface of the outer mirror surface based on the energizing, wherein the inner holder surface opposes the inner mirror surface, wherein the first holder side opposes the first mirror side, wherein the at least one of the rotating of the outer mirror surface in the forward direction from the original position to the at least one extreme position and the rotating of the outer mirror surface in the reverse direction from the at least one extreme position to the original position is based on the attracting.

11. The moving side mirror of claim 10, wherein the at least one electromagnet is configured for de-energizing after the at least one of the rotating of the outer mirror surface in the forward direction from the original position to the at least one extreme position and the rotating of the outer mirror surface in the reverse direction from the at least one extreme position to the original position, wherein the at least one electromagnet does not attract the at least one iron plate after the de-energizing.

12. The moving side mirror of claim 10 further comprising a spring coupled to the outer mirror surface, wherein the spring comprises a first spring end and a second spring end, wherein the first spring end is attached to a second holder side of the inner holder surface and the second spring end is attached to a second mirror side of the inner mirror surface, wherein the second holder side opposes the second mirror side, wherein the spring is associated with a natural state and at least one extended state, wherein the spring transitions from the natural state to the at least one extended state based on the rotating of the outer mirror surface in the forward direction from the original position to the at least one extreme position, wherein the spring is configured for retracting from the at least one extended state to the natural state based on the de-energizing, wherein the rotating of the outer mirror surface in the reverse direction from the at least one extreme position to the original position is further based on the retracting.

13. The moving side mirror of claim 11 further comprising a stopper coupled to the outer mirror surface, wherein the stopper comprises a first stopper end and a second stopper end, wherein the first stopper end is attached to the inner holder surface, wherein the second stopper end extends towards the inner mirror surface, wherein the stopper is configured for preventing the rotating of the outer mirror surface in the forward direction from the original position to the at least one extreme position after the de-energizing of the at least one electromagnet by supporting the moving side mirror on the second stopper end.

14. The moving side mirror of claim 1, wherein the at least one actuator comprises a solenoid, wherein a first end of a plunger of the solenoid is attached to an inner mirror surface of the moving side mirror, wherein the solenoid is configured for retractably moving the plunger between at least one extended position and a retracted position based on the receiving of the at least one external action, wherein the at least one of the rotating of the outer mirror surface in the forward direction from the original position to the at least one extreme position and the rotating of the outer mirror surface in the reverse direction from the at least one extreme position to the original position is based on the retractably moving.

15. The moving side mirror of claim 1, wherein the at least one actuator comprises a hydraulic assembly, wherein a first end of a shaft of the hydraulic assembly is attached to an inner mirror surface of the outer mirror surface, wherein the hydraulic assembly is configured for retractably moving the shaft between at least one extended position and a retracted position based on the receiving of the at least one external action, wherein the at least one of the rotating of the outer mirror surface in the forward direction from the original position to the at least one extreme position and the rotating of the outer mirror surface in the reverse direction from the at least one extreme position to the original position is based on the retractably moving.

16. The moving side mirror of claim 1, wherein the at least one actuator comprises a motor, wherein a shaft of the motor is mechanically coupled with the rotating assembly, wherein the motor is configured for reversibly rotating the shaft between a first position and at least one second position based on the receiving of the at least one external action, wherein the at least one of the rotating of the outer mirror surface in the forward direction from the original position to the at least one extreme position and the rotating of the outer mirror surface in the reverse direction from the at least one extreme position to the original position is based on the reversibly rotating.

17. The moving side mirror of claim 1, wherein the at least one extreme position comprises a plurality of extreme positions, wherein the at least one external action comprises a plurality of external actions, wherein the plurality of external actions is characterized by an amount of an external force applied on the at least the portion of the at least one input device, wherein the rotating of the outer mirror surface around the at least one axis in the forward direction from the original position to the plurality of extreme positions is further based on the amount of the external force applied on the at least the portion of the at least one input device.

18. The moving side mirror of claim 1, wherein the at least one external action comprises applying an external force on the at least the portion of the at least one input device and removing the external force from the at least one the portion of the at least one input device after the applying, wherein the rotating of the outer mirror surface in the forward direction from the original position to the at least one extreme position is further based on the applying of the external force, wherein the rotating of the outer mirror surface in the reverse direction from the at least one extreme position to the original position is further based on the removing of the external force.

* * * * *